US012495033B2

(12) United States Patent
Madtha et al.

(10) Patent No.: US 12,495,033 B2
(45) Date of Patent: Dec. 9, 2025

(54) TESTING DIGITAL CERTIFICATES IN AN EXECUTION ENVIRONMENT OF A COMPUTING NETWORK

(71) Applicant: Oracle International Corporation, Redwood Shores, CA (US)

(72) Inventors: Jivan Joseph Madtha, Saratoga, CA (US); Ayman Elakhwas, Austin, TX (US); Bill Chau, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 105 days.

(21) Appl. No.: 18/599,683

(22) Filed: Mar. 8, 2024

(65) Prior Publication Data

US 2025/0286882 A1   Sep. 11, 2025

(51) Int. Cl.
*H04L 9/40*   (2022.01)
(52) U.S. Cl.
CPC ................. *H04L 63/0823* (2013.01)
(58) Field of Classification Search
CPC .............. H04L 63/0823; H04L 63/104
See application file for complete search history.

(56) References Cited

U.S. PATENT DOCUMENTS

| | | | | |
|---|---|---|---|---|
| 2011/0004763 A1* | 1/2011 | Sato | ..................... | H04L 63/0823 |
| | | | | 713/175 |
| 2015/0334110 A1* | 11/2015 | Bishop | ................ | H04L 63/0272 |
| | | | | 713/156 |
| 2020/0322134 A1* | 10/2020 | Duval | ................. | H04L 63/0823 |
| 2025/0175460 A1* | 5/2025 | Ramaseshan | ........... | H04L 63/10 |

* cited by examiner

*Primary Examiner* — Gil H. Lee
(74) *Attorney, Agent, or Firm* — Invoke

(57) ABSTRACT

A system utilizes a testing service executing on a first network entity executing in an execution environment of a virtual cloud network to perform a set of testing operations including receiving, at the first network entity, a first entity certificate issued based on the first CA certificate and utilizing the first testing service to authenticate the first entity certificate against the first CA certificate. While executing the set of testing operations, the second CA certificate is active in the execution environment. Responsive to determining that the set of testing operations are successful, the system activates the first CA certificate in the execution environment by transmitting to a second network entity, a second entity certificate for authentication against the first CA certificate that supersedes a third entity certificate issued to the second network entity for authentication against the second CA certificate.

20 Claims, 17 Drawing Sheets

TESTING DIGITAL CERTIFICATES IN AN EXECUTION ENVIRONMENT OF A COMPUTING NETWORK

TECHNICAL FIELD

The present disclosure relates to distribution of digital certificates to network entities of a computing network. More particularly, the present disclosure relates to testing the digital certificates in connection with distribution of digital certificates to the network entities.

BACKGROUND

A computing network, such as a virtual cloud network, includes network entities that communicate with one another. Communications between network entities may be performed in accordance with a security protocol, whereby network entities authenticate one another by presenting a digital certificate. A digital certificate may be issued to a network entity by a certificate authority (CA). The digital certificate includes a digital signature generated using a private key of the CA that issued the digital certificate. The digital signature can be validated using a CA certificate of the CA that includes a public key corresponding to the private key. When a network entity presents a valid digital certificate to another network entity, the other network entity can trust that it is communicating with the network entity, as opposed to some unknown entity, based on a trust relationship with a CA that issued the digital certificate.

A certificate bundle includes a set of CA certificates for validating digital certificates issued to network entities. The certificate bundle is distributed to network entities throughout the computing network. New digital certificates are periodically issued to network entities. In some instances, the new digital certificates are issued based on a new CA certificate that supersedes a previous CA certificate. Network entities with the existing certificate bundle, which does not include the new CA certificate, are not able to validate the new digital certificates.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment, and refer to at least one embodiment. In the drawings.

DETAILED DESCRIPTION

Figure 1:
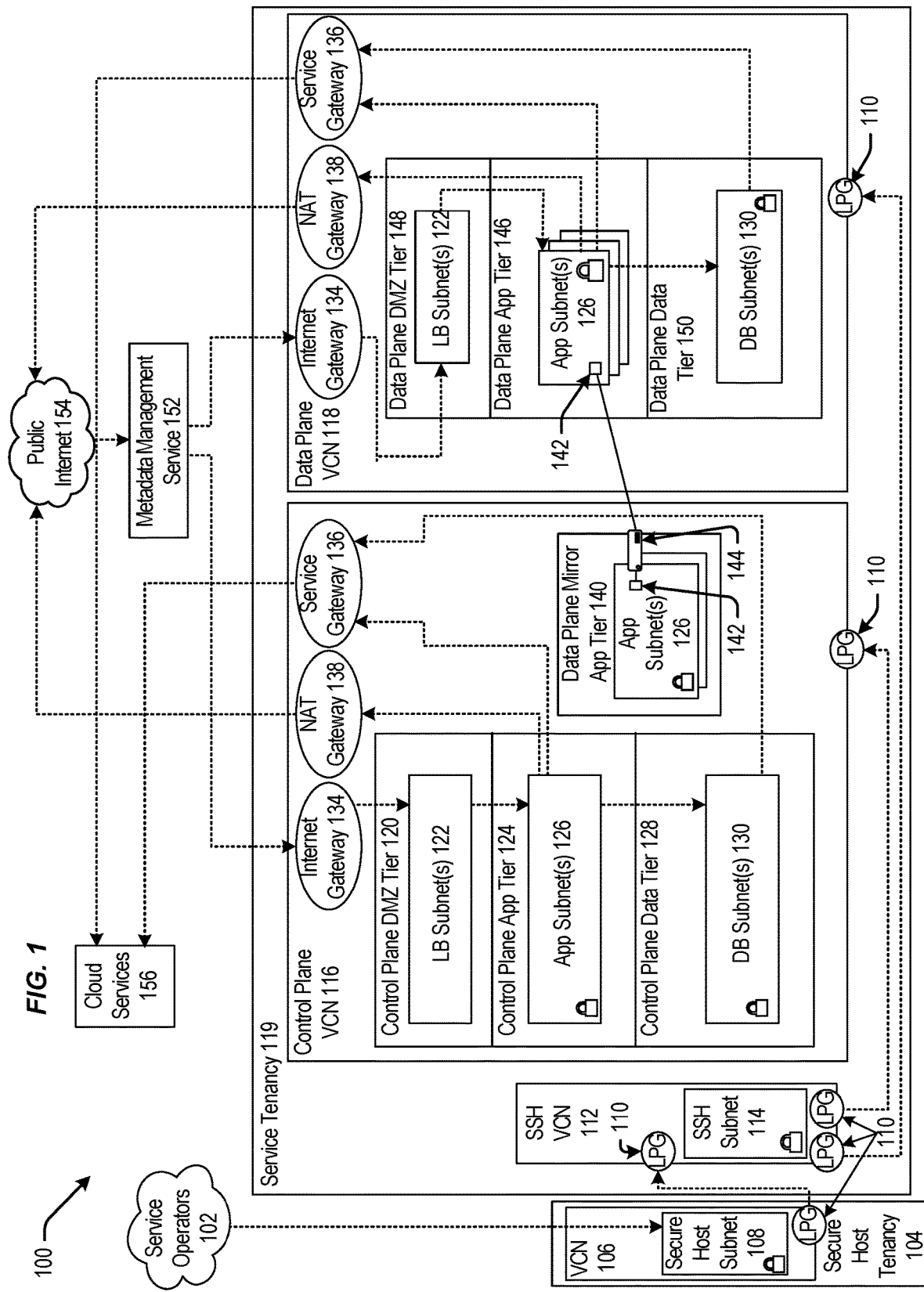
FIGS. 1-4 are block diagrams illustrating patterns for implementing a cloud infrastructure as a service system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. AUTHENTICATING NETWORK ENTITIES
3. CLOUD COMPUTING TECHNOLOGY
4. COMPUTER SYSTEM
5. ARCHITECTURAL OVERVIEW
6. EXAMPLE CERTIFICATE DISTRIBUTION PROCESSES
7. EXAMPLE TESTING PROCESSES
8. MISCELLANEOUS; EXTENSIONS

1. General Overview

A system executes a certificate distribution process that incrementally increases exposure to an execution environment of a computing network in response to successful testing processes executed at incremental steps of the certificate distribution process. An example certificate distribution process includes distributing to a computing network a certificate bundle that includes one or more CA certificates for use in authenticating entity certificates issued to network entities of the computing network. Additionally, or alternatively, an example certificate distribution process includes distributing entity certificates to the computing network. The incremental exposure to the execution environment of the computing network may include using a sandbox sub-environment of the execution environment to perform a set of testing operations prior to advancing to a next stage in the certificate distribution process. Additionally, or alternatively, the incremental exposure to the execution environment may include utilizing a testing service installed on a network entity executing in the execution environment to perform a set of testing operations prior to advancing to a next stage in the certificate distribution process. Additionally, or alternatively, the incremental exposure to the execution environment may include utilizing a production service installed on a network entity executing in the execution environment to perform a set of testing operations prior to advancing to a next stage in the certificate distribution process.

In one example, the system generates a first certificate bundle in an execution environment of the computing network. The first certificate bundle includes a first CA certificate and a second CA certificate. A second certificate bundle that includes a second instance of the second CA certificate is already installed in the execution environment when the system generates the first certificate bundle in the execution environment. In one example, the first certificate bundle is generated in a first portion of the execution environment, and the second certificate bundle is installed in a second portion of the execution environment. The first certificate bundle may be a new certificate bundle that the system generates to replace the second certificate bundle. The first CA certificate may be a new CA certificate that is generated to replace the second CA certificate. The first certificate bundle includes the second CA certificate so that the second CA certificate can continue to be utilized to authenticate entity certificates that were issued from the second CA certificate. In one example, the second CA certificate may be utilized prior to replacing the entity certificates issued from the second CA certificate with new entity certificates issued from the first CA certificate. Additionally, or alternatively, the second CA certificate may be utilized, in at least portion of an execution environment, to authenticate entity certificates issued from the first CA certificate while the first CA certificate is subject to one or more testing processes as described herein.

In one example, the system executes a first testing process for utilizing a sandbox sub-environment executing in a first portion of the execution environment to perform a first set of one or more testing operations associated with the first certificate bundle. While executing the first testing process, the first certificate bundle is yet to be installed in the first portion of the execution environment, and the second certificate bundle that includes the second instance of the second CA certificate is installed in the first portion of the execution environment. In response to determining that the first set of one or more testing operations is successful, the system installs the first certificate bundle, including the first CA certificate and the second CA certificate, on a first network entity executing in the first portion of the execution environment. By installing the first certificate bundle in the first portion of the execution environment, the first certificate bundle supersedes the second certificate bundle in the first portion of the execution environment.

In one example, the system executes a second testing process for utilizing a first testing service executing on the first network entity to perform a second set of one or more testing operations associated with the first certificate bundle. While executing the second testing process, the first CA certificate is yet to be activated in the first portion of the execution environment, and the second CA certificate is active in the first portion of the execution environment. In response to determining that the second set of one or more testing operations is successful, the system activates the first CA certificate in the first portion of the execution environment at least by transmitting a first entity certificate to a second network entity executing in the first portion of the execution environment for authentication against the first CA certificate. The first entity certificate supersedes a second entity certificate previously utilized by the second network entity for authentication against the second CA certificate.

In one example, the system executes a third testing process for utilizing a production service executing on a third network entity executing in the first portion of the execution environment to perform a third set of one or more testing operations associated with the first certificate bundle. In response to determining that the third set of one or more testing operations is successful, the system removes the second CA certificate from the first portion of the execution environment. The system may remove the second CA certificate from the first portion of the execution environment by generating a third certificate bundle in the execution environment that includes the first CA certificate and that does not include the second CA certificate.

In one example, upon successfully performing the certificate distribution process in the first portion of the execution environment, the system may perform the certificate distribution process in a second portion of the execution environment. The first portion of the execution environment may correspond to a first availability domain of the computing network and/or to a first set of one or more regions of the computing network. Additionally, or alternatively, the second portion of the execution environment may correspond to a second availability domain of the computing network and/or to a second set of one or more regions of the computing network.

In one example, the system performs one or more of the testing processes with respect to a plurality of segments of the execution environment prior to advancing to a next stage in the certificate distribution process. A segment of the execution environment may include a plurality of network entities. The plurality of network entities may include a host and a set of one or more nodes. Additionally, or alternatively, the segment of the execution environment may include a particular service, resource, or infrastructure that the system selects for testing. The system may test a plurality of services, resources, or infrastructures prior to advancing to a next stage in the certificate distribution process. Additionally, or alternatively, the system may test a plurality of instances of the particular service, resource, or infrastructure prior to advancing to a next stage in the certificate distribution process.

In one example, the system utilizes a sandbox sub-environment of the execution environment to perform a set of testing operations associated with a new certificate bundle prior to distributing the new certificate bundle for installation in the execution environment. The system utilizes the sandbox sub-environment to test the certificate bundle in the execution environment without impacting network entities that are executing in the execution environment.

The set of testing operations performed utilizing a sandbox sub-environment include installing a first certificate bundle on a first sandbox instance executing in the sandbox sub-environment. The first certificate bundle may include a first CA certificate and a second CA certificate. The set of testing operations performed utilizing the sandbox sub-environment further include a set of one or more testing processes associated with the first certificate bundle. While executing the set of one or more testing processes in the sandbox sub-environment, the second CA certificate is active in the execution environment for authenticating entity certificates issued to network entities based on the second CA certificate. The system executes the set of one or more testing processes at least by utilizing the sandbox instance to perform a first set of one or more testing operations. The first set of one or more testing operations may include receiving, at the sandbox instance, a first entity certificate issued based on the first CA certificate and utilizing the sandbox instance to authenticate the first entity certificate against the first CA certificate. In one example, the system determines, based at least on successfully authenticating the first entity certificate against the first CA certificate, that the first set of one or more testing operations is successful. The system may execute additional sets of testing operations with respect to additional sandbox instances executing in the sandbox sub-environment. In one example, the system utilizes a second sandbox instance to perform a second set of one or more testing operations that include utilizing the second sandbox instance to authenticate a second entity certificate issued based on the first CA certificate. In response to determining that the set of one or more testing processes in the sandbox sub-environment are successful, the system distributes the first certificate bundle to the execution environment.

In one example, the system utilizes a testing service installed on a network entity that is executing in an execution environment to perform a set of testing operations associated with a new certificate bundle prior to activating a new CA certificate in the new certificate bundle. The system utilizes the testing service to test the new CA certificate on a network entity that is executing in the execution environment when the new CA certificate has not yet been activated in the execution environment.

The set of testing operations performed utilizing a testing service include installing a first certificate bundle on a first network entity that includes a testing service. The first certificate bundle may include a first CA certificate and a second CA certificate. The set of testing operations performed utilizing the testing service further include a set of one or more testing processes associated with the first certificate bundle. While executing the set of one or more testing processes, the second CA certificate is active in the execution environment for authenticating entity certificates issued to network entities based on the second CA certificate. The system executes the set of one or more testing processes at least by utilizing a first testing service executing on the first network entity to perform a first set of one or more testing operations. The first set of one or more testing operations may include receiving, at the first network entity, a first entity certificate issued based on the first CA certificate and utilizing the first testing service to authenticate the first entity certificate against the first CA certificate. In one example, the system determines, based at least on successfully authenticating the first entity certificate against the first CA certificate, that the first set of one or more testing operations is successful. The system may execute additional sets of testing operations with respect to additional network entities executing in the execution environment. In one example, the system utilizes a second testing service executing on a second network entity to perform a second set of one or more testing operations that include utilizing the second testing service to authenticate a second entity certificate issued to the second network entity based on the first CA certificate. In response to determining that the set of one or more testing processes are successful, the system activates the first CA certificate in the execution environment at least by transmitting entity certificates to network entities for authentication against the first CA certificate. The entity certificates transmitted to network entities for authentication against the first CA certificate supersede the entity certificates issued to network entities based on the second CA certificate.

In one example, the system utilizes a production service installed on a network entity that is executing in an execution environment to perform a set of testing operations associated with a new certificate bundle. The testing operations that utilize the production service may be performed for a first portion of the execution environment where the new CA certificate is active, while the new CA certificate is yet to be activated in a second portion of the execution environment. The system utilizes the production service in the first portion of the execution environment to test the new CA certificate in an active state prior to activating the new CA certificate in the second portion of the execution environment.

The set of testing operations performed utilizing a production service include installing a first certificate bundle on a first network entity that includes a production service. The first certificate bundle may include a first CA certificate and a second CA certificate. The set of testing operations performed utilizing the production service further include a set of one or more testing processes associated with the first certificate bundle. While executing the set of one or more testing processes, the second CA certificate is active in the execution environment for authenticating entity certificates issued to network entities based on the second CA certificate. The system executes the set of one or more testing processes at least by utilizing a first production service executing on the first network entity to perform a first set of one or more testing operations. The first set of one or more testing operations may include receiving, at the first network entity, a first entity certificate issued based on the first CA certificate and utilizing the first production service to authenticate the first entity certificate against the first CA certificate. In one example, the system determines, based at least on successfully authenticating the first entity certificate against the first CA certificate, that the first set of one or more testing operations is successful. The system may execute additional sets of testing operations with respect to additional network entities executing in the execution environment. The network entities that the system utilizes to perform the testing operations utilizing a production service may be the same or different from the network entities that the system utilizes to perform the testing operations utilizing a testing service. In one example, the system utilizes a second production service executing on a second network entity to perform a second set of one or more testing operations that include utilizing the second production service to authenticate a second entity certificate issued to the second network entity based on the first CA certificate. In response to determining that the set of one or more testing processes are successful, the system removes the second CA certificate from the execution environment.

One or more embodiments described in this Specification and/or recited in the claims may not be included in this General Overview section.

2. Authenticating Network Entities

Network entities may utilize the CA certificates to authenticate other network entities associated with the virtual cloud network. The CA certificates that are utilized to authenticate network entities may be stored in a certificate bundle. In one example, communications between network entities may be conducted according to a security protocol. The security protocol may include authenticating a network entity based on an entity certificate issued to the network entity by a CA, for example, prior to establishing communications with the network entity.

One or more embodiments may include techniques described in U.S. patent application Ser. No. 18/354,498, filed Jul. 18, 2023 (the '498 Application). The entirety of the '498 Application is incorporated herein by reference. In one example, one or more embodiments may include one or more systems, components, and/or operations pertaining to validating network entity certificate chains as described in the '498 Application.

In one example, the entity certificate and a CA certificate corresponding to the CA that issued the entity certificate may represent at least a portion of a certificate chain. The certificate chain may include the CA certificate and one or more subordinate certificates, including the entity certificate issued by the CA based on the CA certificate. To authenticate the network entity, one or more signature-key pairs in the certificate chain are validated.

In one example, a top-level CA may issue the entity certificate. In this case, the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate and the public key of the intermediate CA, and (ii) the digital signature of the root CA in the intermediate CA certificate and the public key of the root CA.

As used herein, the term "certificate authority certificate" or "CA certificate" refers to a digital certificate issued by a certificate authority to establish its own identity and authenticity. A certificate authority certificate may be a root CA certificate or an intermediate CA certificate. A certificate authority certificate may be used to sign and issue other digital certificates including those used for secure communication between network entities.

As used herein, the term "certificate authority" or "CA" refers to an entity responsible for issuing and managing digital certificates. The certificate authority verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root certificate authority. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root certificate authority. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate certificate authority according to a root certificate authority.

As used herein, the term "entity certificate" refers to a digital certificate issued to an entity such as a network entity associated with a virtual cloud network. An entity certificate may be used to verify the identity of the entity and enable secure communication between entities such as between network entities in a virtual cloud network. An entity certificate may be issued by a certificate authority, such as root CA or an intermediate certificate authority.

As used herein, the term "network entity" refers to a device, component, or element within a computer network and/or cloud infrastructure. A network entity may be implemented in hardware and/or software.

As used herein, the term "subordinate certificate" refers to a digital certificate that was issued based on another digital certificate. An entity certificate is a subordinate certificate to one or more CA certificates that share a certificate chain with the entity certificate including the CA certificate of the CA that issued the entity certificate. An intermediate CA certificate is a subordinate certificate to a root CA certificate of the root CA that issued the intermediate CA certificate.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VM during its lifecycle and may be automatically generated and managed by the virtual cloud network infrastructure. An instance principal certificate may provide limited access to communicate with certain network entities. For example, an instance principal may be issued to a network entity, and the limited access of the instance principal may be based on permissions assigned to the network entity.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

3. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components; example services include billing software, monitoring software, logging software, load balancing software, clustering software, etc. Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on the VMs, deploy middleware such as databases, create storage buckets for workloads and backups, and install enterprise software into that VM. Customers can then use the provider's services to perform various functions, including balancing network traffic, troubleshooting application issues, monitoring performance, and managing disaster recovery, etc.

In some cases, a cloud computing model will involve the participation of a cloud provider. The cloud provider may, but need not, be a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider below the hypervisor layer (e.g., the servers, storage, network hardware, and virtualization). Thus, the customer may be responsible for handling (OS), middleware, and/or application deployment such as on self-service virtual machines. The self-service virtual machines can be spun up on demand.

In some examples, IaaS provisioning may refer to acquiring computers or virtual hosts for use, even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how components interact) can be defined by one or more configuration files. Thus, the overall topology of the infrastructure (e.g., what resources depend on one another and how resources work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually and/or using a provisioning tool) prior to deployment of code to be executed on the infrastructure. However, in some examples, the infrastructure that will deploy the code may first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100 according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, such as portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers, including personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems such as Google Chrome OS. Additionally, or alternatively, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116. The app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way; the service gateway 136 can make API calls to cloud services 156, and cloud services 156 can send requested data to the service gateway 136. However, cloud services 156 may not initiate API calls to the service gateway 136.

In some examples, the secure host tenancy 104 can be directly connected to the service tenancy 119. The service tenancy 119 may otherwise be isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118. The control plane VCN 116 and the data plane VCN 118 may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154 for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119. The service tenancy 119 may be isolated from public Internet 154.

Figure 2:
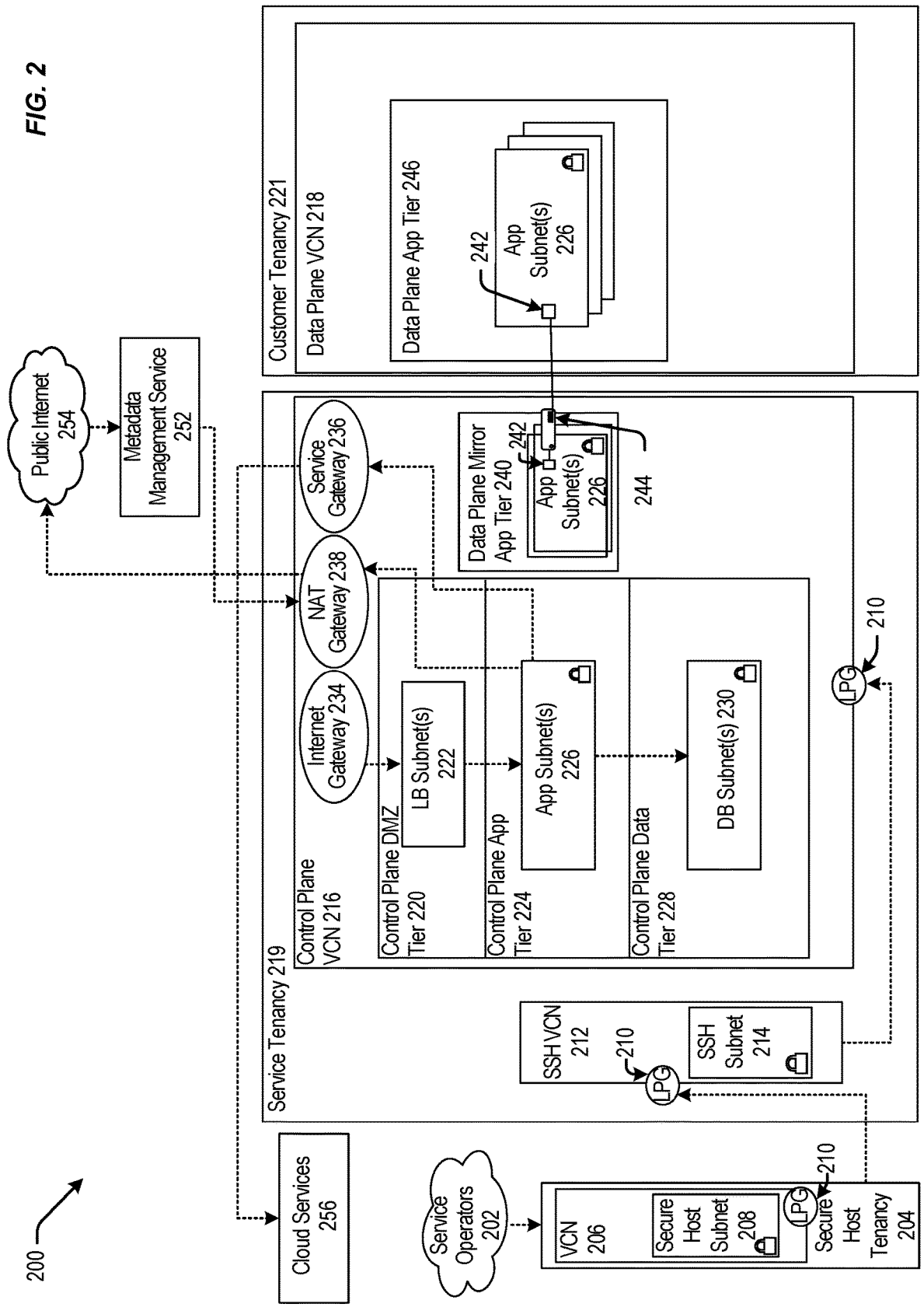

FIG. 2 is a block diagram illustrating another example pattern of an IaaS architecture 200 according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), and a control plane data tier 228 (e.g., the control plane data tier 128 of FIG. 1)

that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216. The app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 per customer, and the IaaS provider may, for the customer, set up a unique, compute instance 244 that is contained in the service tenancy 219. Compute instance 244 may allow communication between the control plane VCN 216 contained in the service tenancy 219 and the data plane VCN 218 that is contained in the customer tenancy 221. The compute instance 244 may allow resources provisioned in the control plane VCN 216 that is contained in the service tenancy 219 to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment or other usage of resources of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1" may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
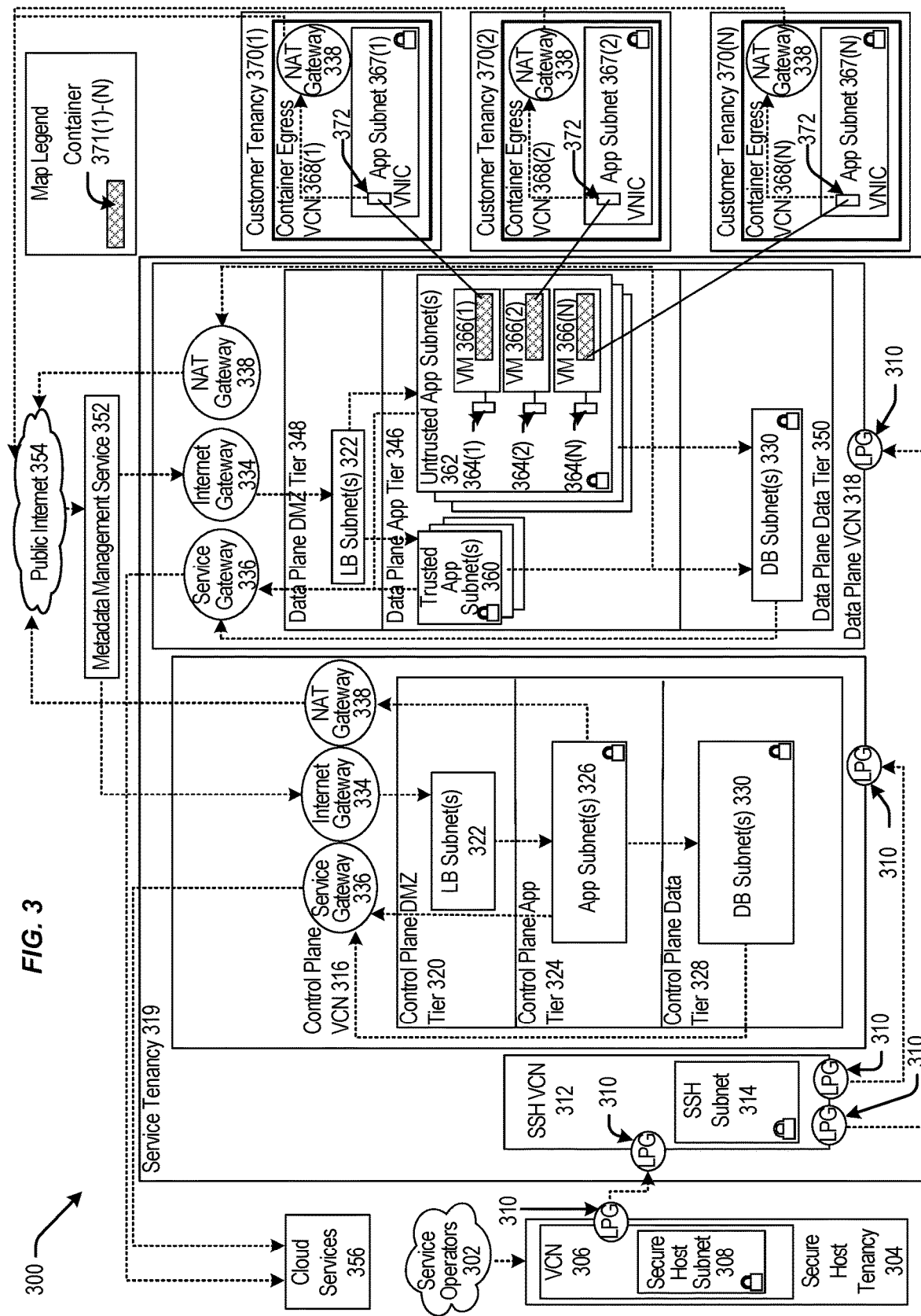

FIG. 3 is a block diagram illustrating another example pattern of an IaaS architecture 300 according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), and a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360, untrusted app subnet(s) 362 of the data plane app tier 346, and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Tenant(s) VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether or not to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code), where the containers 381(1)-(N) may be contained in at least the VM 366(1)-(N) that are contained in the untrusted app subnet(s) 362) that may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of the customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
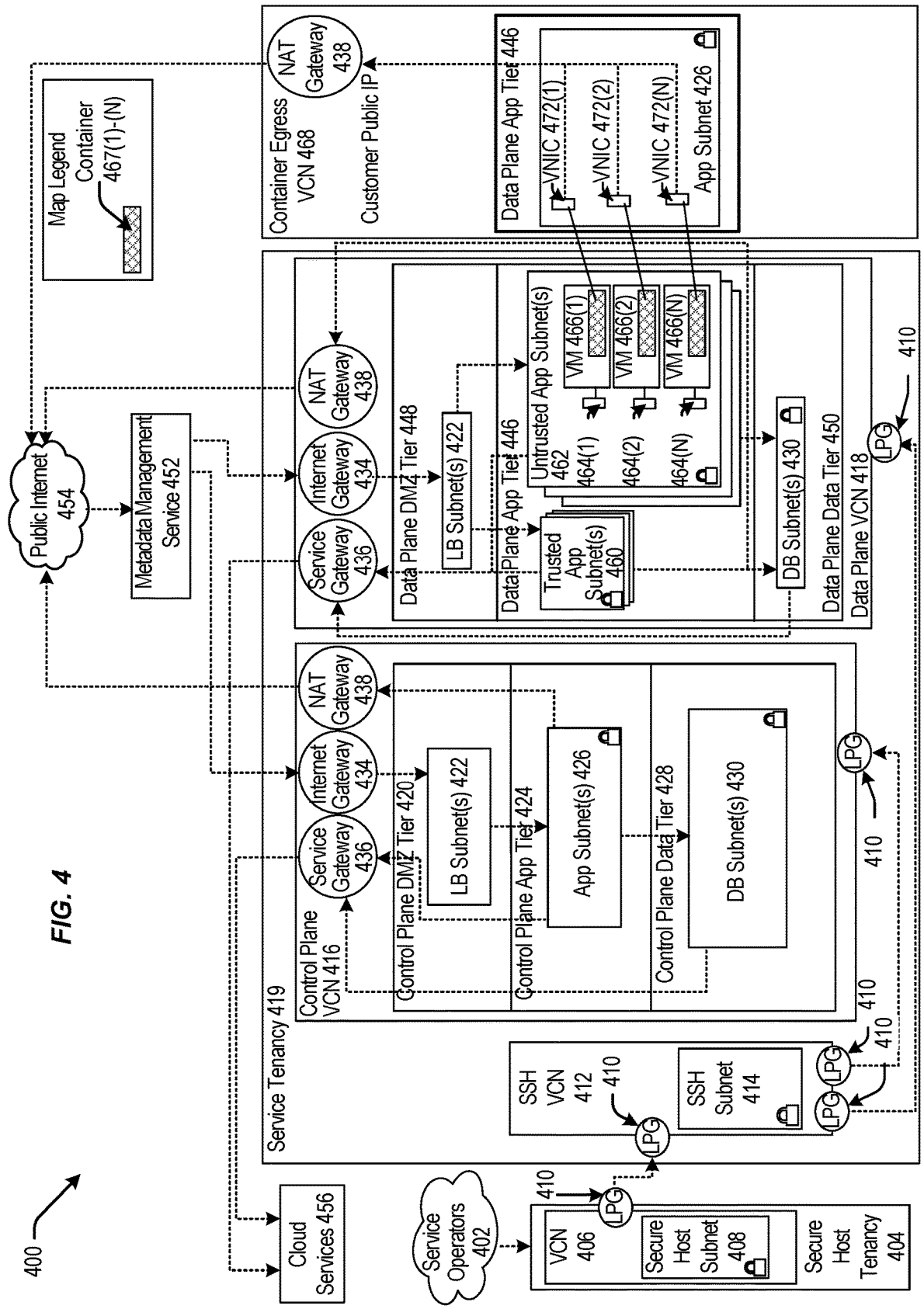

FIG. 4 is a block diagram illustrating another example pattern of an IaaS architecture 400 according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), and a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Tenant VM 466(1)-(N) can run code in a respective container 467(1)-(N) and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for customers can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that: request a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, and 400 may include components that are different and/or additional to the components shown in the figures. Further, the embodiments shown in the figures represent non-exhaustive examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from one other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network such as a physical network. A node in an overlay network corresponds to a respective node in the underlying network. Hence, a node in an overlay network is associated with both an overlay address (to address to the overlay node) and an underlay address (to address the underlay node that implements the overlay node). An overlay node may be a digital device and/or a software process, such as a virtual machine, an application instance, or a thread. A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of one another. Network resources are dynamically assigned to the requests and/or clients on an on-demand basis. Network resources assigned to a request and/or client may be scaled up or down based on one or more of the following: (a) the computing services requested by a particular client, (b) the aggregated computing services requested by a particular tenant, or (c) the aggregated computing services requested of the computer network. Such a computer network may be referred to as a "cloud network."

In an embodiment, a service provider provides a cloud network to one or more end users. Various service models may be implemented by the cloud network, including, but not limited, to Software-as-a-Service (SaaS), Platform-as-a-Service (PaaS), and Infrastructure-as-a-Service (IaaS). In SaaS, a service provider provides end users the capability to use the service provider's applications that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including, but not limited to, a private cloud, a public cloud, and a hybrid cloud. In a private cloud, network resources are provisioned for exclusive use by a particular group of one or more entities; the term "entity" as used herein refers to a corporation, organization, person, or other entity. The network resources may be local to and/or remote from the premises of the particular group of entities. In a public cloud, cloud resources are provisioned for multiple entities that are independent from one another (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on one other. A call from an application at the private cloud to an application at the public cloud (and vice versa) may be executed through the interface.

In an embodiment, tenants of a multi-tenant computer network are independent of one another. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with other tenants. Various tenant isolation approaches may be used.

In an embodiment, a tenant is associated with a tenant ID. The network resource of the multi-tenant computer network is tagged with a tenant ID. A tenant is permitted access to a particular network resource when the tenant and the particular network resources are associated with a same tenant ID.

In an embodiment, a tenant is associated with a tenant ID. An application, implemented by the computer network, is tagged with a tenant ID. Additionally, or alternatively, data structures and/or datasets, stored by the computer network, are tagged with a tenant ID. A tenant is permitted access to a particular application, data structure, and/or dataset when the tenant and the particular application, data structure, and/or dataset are associated with a same tenant ID.

As an example, a database implemented by a multi-tenant computer network may be tagged with a tenant ID. A tenant associated with the corresponding tenant ID may access data of a particular database. As another example, an entry in a database implemented by a multi-tenant computer network may be tagged with a tenant ID. A tenant associated with the corresponding tenant ID may access data of a particular entry. However, multiple tenants may share the database.

In an embodiment, a subscription list identifies a set of tenants, and, for a particular tenant, a set of applications that the particular tenant is authorized to access. For a particular application, a list of tenant IDs of tenants authorized to access the particular application is stored. A tenant is permitted access to a particular application when the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

4. Computer System

Figure 5:
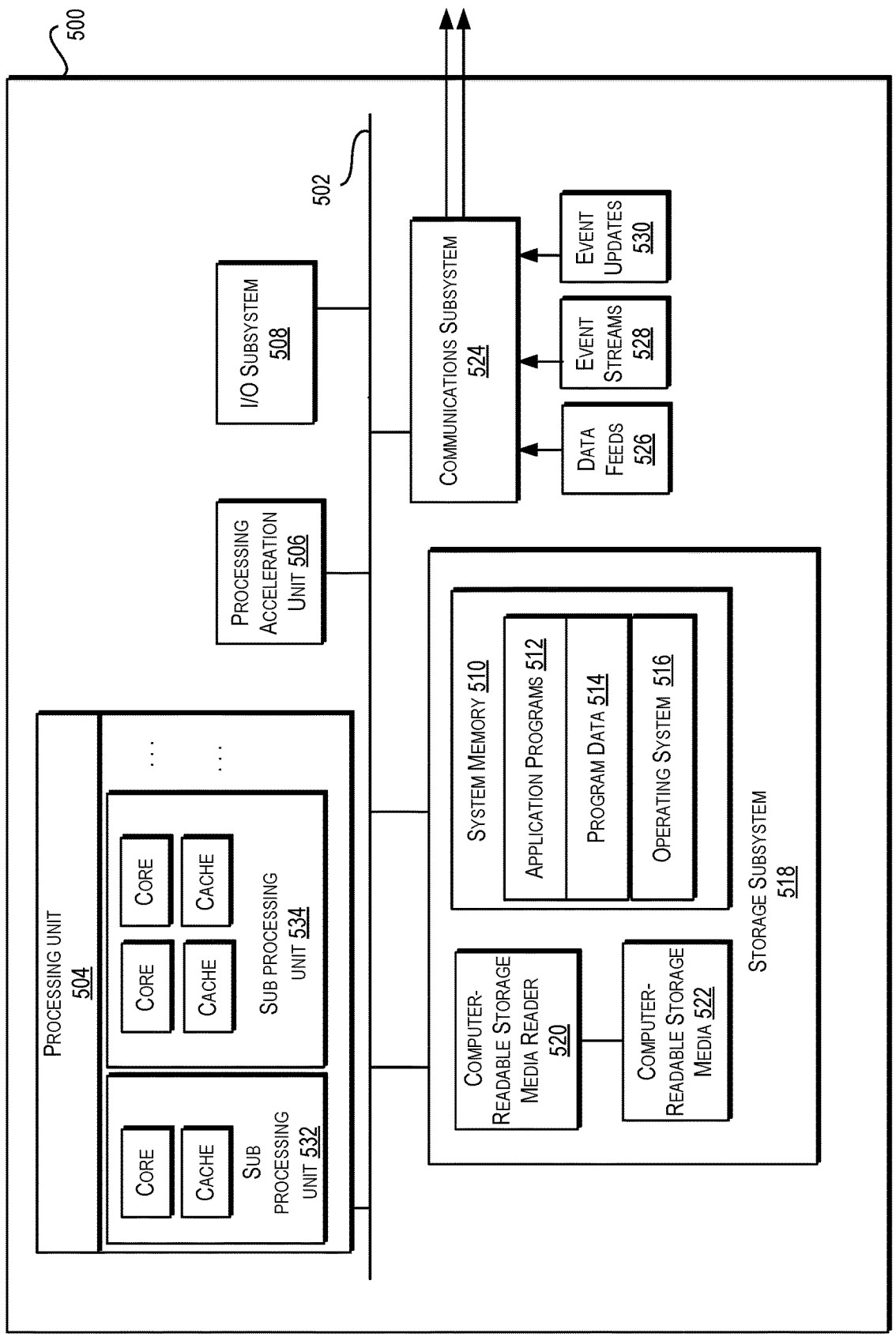
FIG. 5 is a hardware system in accordance with one or more embodiments.

FIG. 5 illustrates an example computer system 500. An embodiment of the disclosure may be implemented upon the computer system 500. As shown in FIG. 5, computer system 500 includes a processing unit 504 that communicates with peripheral subsystems via a bus subsystem 502. These peripheral subsystems may include a processing acceleration unit 506, an I/O subsystem 508, a storage subsystem 518, and a communications subsystem 524. Storage subsystem 518 includes tangible computer-readable storage media 522 and a system memory 510.

Bus subsystem 502 provides a mechanism for letting the various components and subsystems of computer system 500 to communicate with one another as intended. Although bus subsystem 502 is shown schematically as a single bus, alternative embodiments of the bus subsystem may utilize multiple buses. Bus subsystem 502 may be any of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Additionally, such architectures may be implemented as a Mezzanine bus manufactured to the IEEE P1386.1 standard.

Processing unit 504 controls the operation of computer system 500. Processing unit 504 can be implemented as one or more integrated circuits (e.g., a conventional microprocessor or microcontroller). One or more processors may be included in processing unit 504. These processors may include single core or multicore processors. In certain embodiments, processing unit 504 may be implemented as one or more independent processing units 532 and/or 534 with single or multicore processors included in the processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, the program code to be executed can be wholly or partially resident in processing unit 504 and/or in storage subsystem 518. Through suitable programming, processing unit 504 can provide various functionalities described above. Computer system 500 may additionally include a processing acceleration unit 506 that can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include medical imaging input devices such as computed tomography, magnetic resonance imaging, position emission tomography, or medical ultrasonography devices. User interface input devices may also include audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include any type of device and mechanism for outputting information from computer system 500 to a user or other computer. For example, user interface output devices may include, without limitation, a variety of display devices that visually convey text, graphics and audio/video information, such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components, including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various programs may be loaded into system memory 510 including, but not limited to, client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.). Different types of RAM configurations may be provided, including a static random access memory (SRAM), a dynamic random access memory (DRAM), and others. In some implementations, system memory 510 may include a basic input/output system (BIOS) containing basic routines that help to transfer information between elements within computer system 500 such as during start-up.

Computer-readable storage media 522 may represent remote, local, fixed, and/or removable storage devices plus storage media for temporarily and/or more permanently containing, storing, computer-readable information for use by computer system 500, including instructions executable by processing unit 504 of computer system 500.

Computer-readable storage media 522 can include any appropriate media known or used in the art, including storage media and communication media, such as but not limited to volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include solid-state drives (SSD) based on non-volatile memory, such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments, communications subsystem 524 can include radio frequency (RF) transceiver components to access wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services, such as Twitter® feeds, Facebook® updates, web feeds such as Rich Site Summary (RSS) feeds, and/or real-time updates from one or more third party information sources.

Additionally, communications subsystem 524 may be configured to receive data in the form of continuous data streams. The continuous data streams may include event streams 528 of real-time events and/or event updates 530 that may be continuous or unbounded in nature with no explicit end. Examples of applications that generate continuous data may include sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended as a non-limiting example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

5. Architectural Overview

Figure 6A:
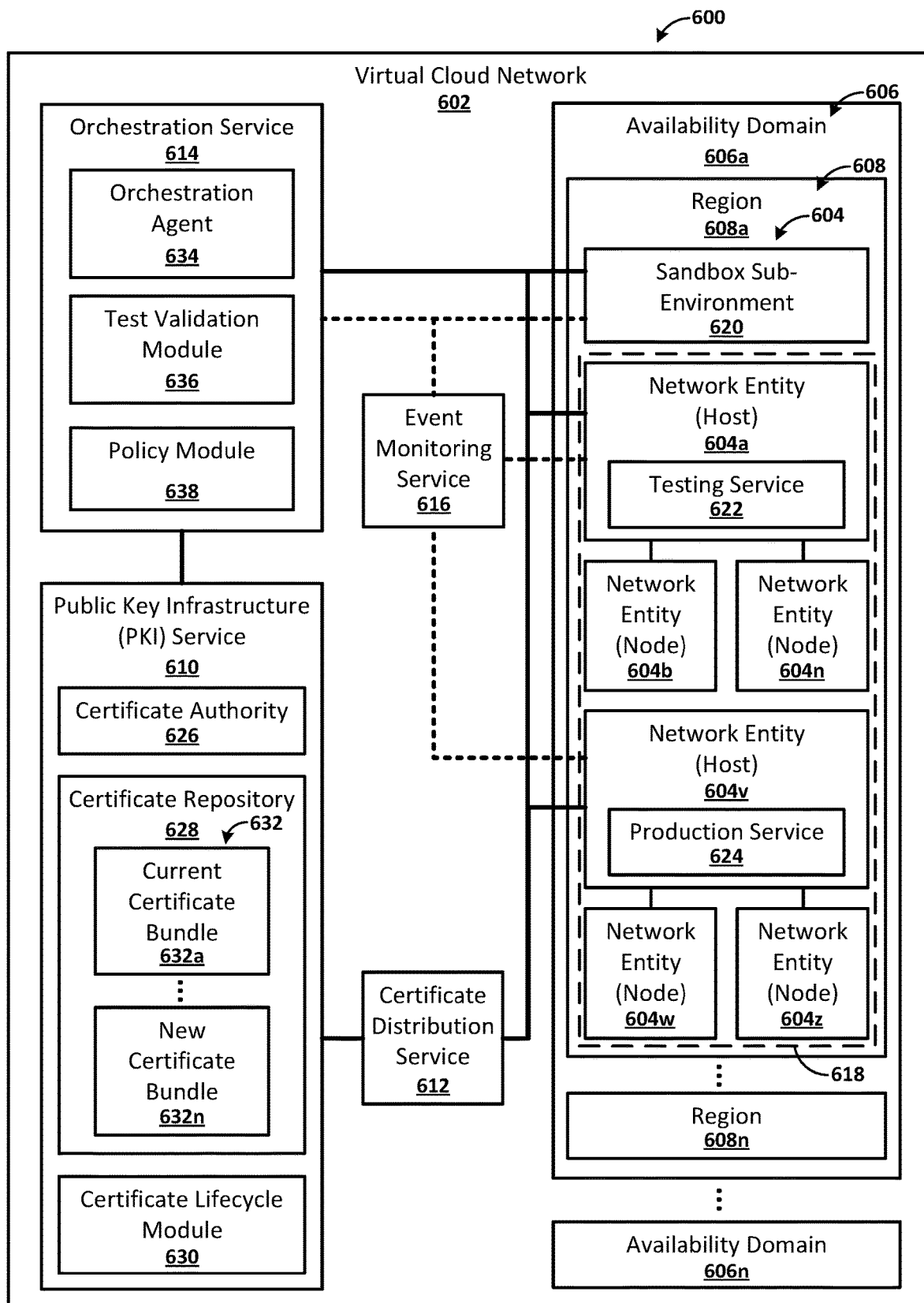
FIG. 6A illustrates features of an example system in accordance with one or more embodiments.
Figure 6B:
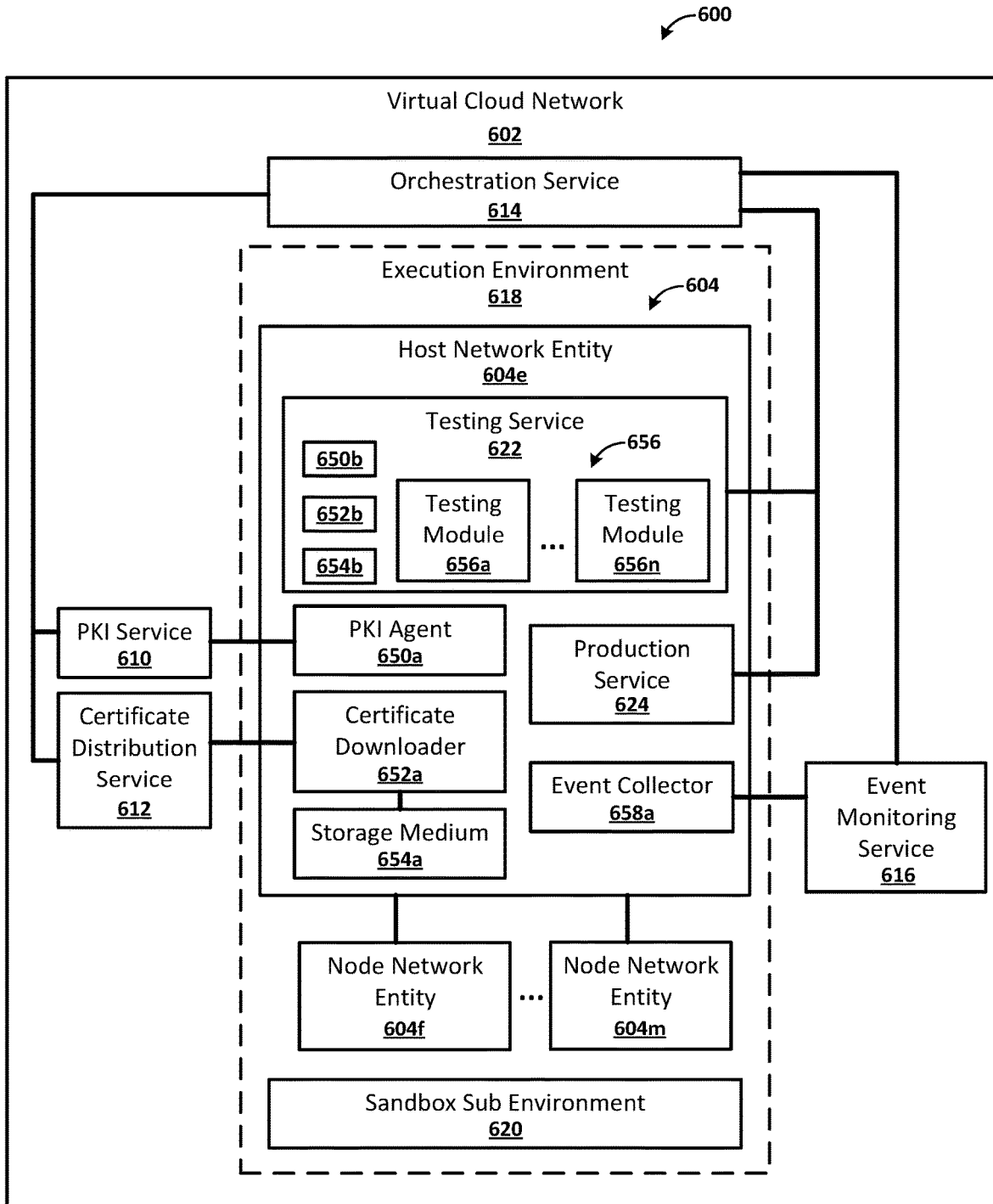
FIG. 6B illustrates features of an example sandbox sub-environment in accordance with one or more embodiments.
Figure 6C:
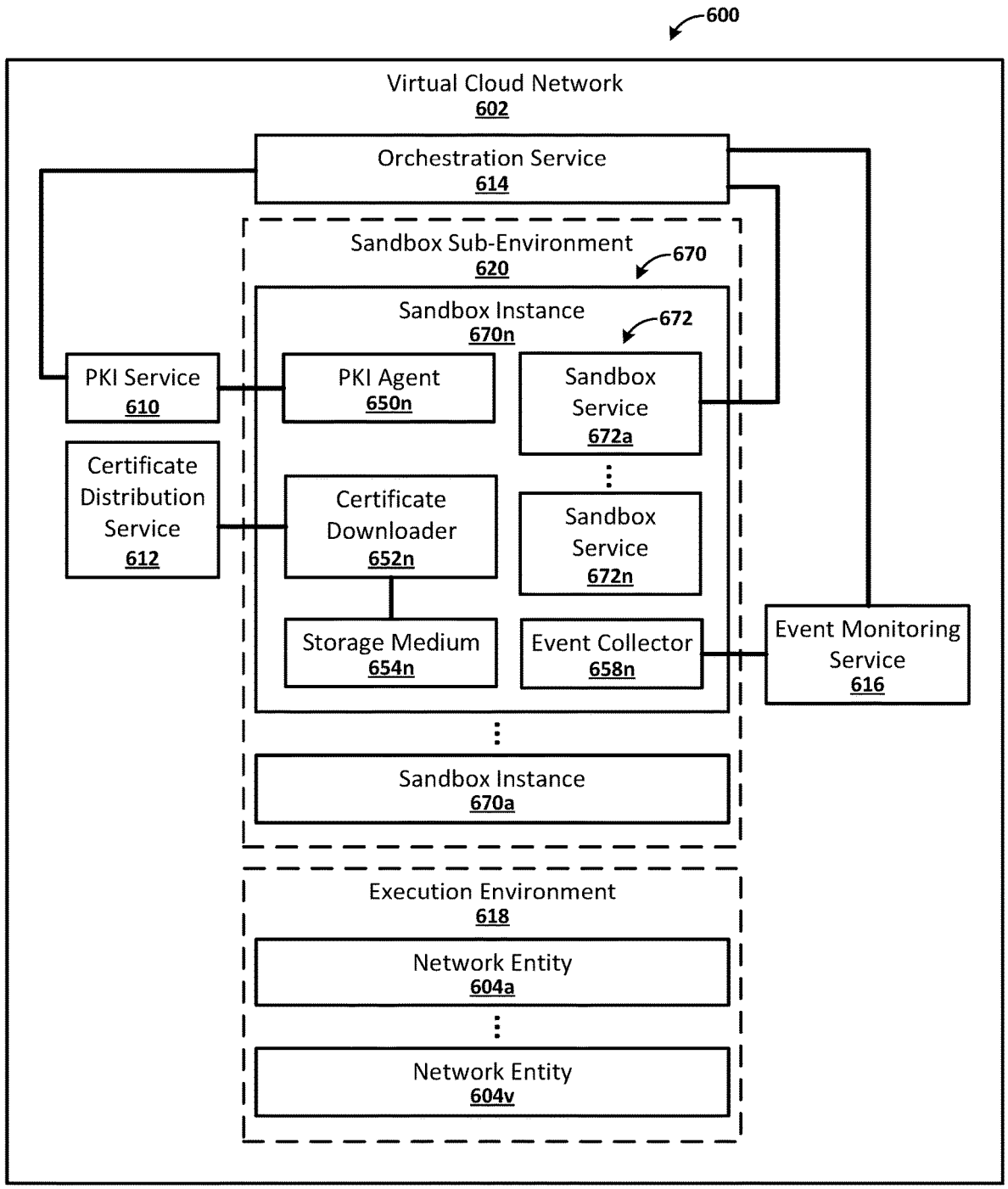
FIG. 6C illustrates features of an example execution environment in accordance with one or more embodiments.

FIGS. 6A-6C illustrate features of an example system 600 in accordance with one or more embodiments. The system 600 described with reference to FIGS. 6A-6C may perform operations pertaining to distribution processes for distributing digital certificates to an execution environment of a computing network. A distribution process may include issuing CA certificates, generating certificate bundles that included the CA certificates, and distributing the certificate bundles to the execution environment. The certificate bundles may be utilized in an authentication protocol for authenticating network entities in the execution environment based on entity certificates issued based on a CA certificate in a certificate bundle. Additionally, or alternatively, a distribution process may include issuing entity certificates to network entities and distributing the entity certificates to the network entities for authentication in the authentication protocol. Additionally, or alternatively, the system 600 described with reference to FIGS. 6A-6C may perform operations pertaining to testing processes for testing digital certificates in an execution environment of a computing network and/or in a sandbox sub-environment executing in the execution environment of the computing network. A testing process may be executed in connection with the distribution of digital certificates to the execution environment. In one example, one or more testing processes may be executed prior to and/or between incremental steps in a distribution process.

A. Example Computing Network

As shown in FIG. 6A, the system 600 includes a computing network such as a virtual cloud network 602. The virtual cloud network 602 includes a plurality of network entities 604 (such as network entity 604*a*, network entity 604*b*, network entity 604*n*, network entity 604*v*, network entity 604*w*, and network entity 604*z*). In one example, network entity 604*a* is a host, and network entity 604*b* and network entity 604*n* are nodes serviced by network entity 604*a*. Additionally, or alternatively, network entity 604*v* is a host, and network entity 604*w* and network entity 604*z* are nodes serviced by network entity 604*v*.

As shown in FIG. 6A, the virtual cloud network 602 may include one or more availability domains 606, such as availability domain 606*a* and availability domain 606*n*. Additionally, or alternatively, the virtual cloud network 602 may include one or more regions 608, such as region 608*a* and region 608*n*. An availability domain 606 includes at least one region 608. A particular region 608 is located in a particular availability domain 606. For example, region 608*a* and region 608*n* are located in availability domain 606*a*. A region 608 includes a plurality of network entities 604. A particular network entity 604 is located in a particular region 608. For example, network entity 604*a*, network entity 604*b*, network entity 604*n*, network entity 604*v*, network entity 604*w*, and network entity 604*z* are located in region 608*a*.

The virtual cloud network 602 further includes a public key infrastructure (PKI) service 610 for generating digital certificates and a certificate distribution service 612 for distributing the digital certificates to the network entities 604. Additionally, the system 600 includes an orchestration service 614 for orchestrating certificate distribution processes and testing processes. Further, the system includes an event monitoring service 616. The event monitoring service monitors events associated with the virtual cloud network 602 such as events associated with the network entities 604. The orchestration service 614 interacts with the event monitoring service 616 and/or directly with the network entities 604 to obtain information that the orchestration service 614 utilizes to orchestrate certificate distribution processes and testing processes.

The virtual cloud network 602 further includes at least one execution environment 618 and at least one sandbox sub-environment 620. The execution environment 618 includes network entities 604 and other portions of the virtual cloud network 602 that deploy and/or run network services, resources, and/or infrastructure. The sandbox sub-environment 620 represents a portion of the execution environment 618 that is logically or physically isolated from the network entities 604 executing in the execution environment 618. As shown in FIG. 6A, the execution environment 618 includes hosts, such as network entity 604*a*, and nodes, such as network entity 604*b* and network entity 604*n*. In one example, the execution environment additionally includes the PKI service 610, the certificate distribution service 612, the orchestration service 614, and/or the event monitoring service 616.

The orchestration service 614 may orchestrate testing processes that are executed within a sandbox sub-environment 620. Additionally, or alternatively, the orchestration service 614 may orchestrate testing processes that are executed within an execution environment 618. The testing processes executed within the sandbox sub-environment 620 are performed without impacting network entities 604 executing in the execution environment 618. The sandbox sub-environment 620 is capable of communicating with the PKI service 610, the certificate distribution service 612, the orchestration service 614, and the event monitoring service 616, for example, for purposes of executing testing processes orchestrated by the orchestration service 614.

In one example, one or more of the network entities 604 execute a testing service 622 for performing testing processes. For example, as shown in FIG. 6A, a testing service 622 is executing on network entity 604*a*. The orchestration service 614 may utilize the testing service 622 to perform testing processes corresponding to a first CA certificate, such as a new CA certificate, that is yet to be activated in the portion of the execution environment 618, where the network entity 604 that is executing testing service 622 is located. The testing processes that utilize the testing service 622 may be performed, while a second CA certificate, such as a current CA certificate, is active in the portion of the execution environment 618, where the network entity 604 that is executing testing service 622 is located.

In one example, one or more of the network entities 604 execute one or more production services 624. A production service may include database services, application hosting services, networking services, security services, identity and access management services, key management services, backup services, container orchestration services, virtual machine services, or content delivery services. For example, as shown in FIG. 6A, a production service 624 is executing on network entity 604*v*. The orchestration service 614 may utilize the production service 624 to perform testing processes corresponding to a first CA certificate, such as a new CA certificate, that is activated in a first portion of the execution environment 618, where the network entity 604 executing production service 624 is located. The testing processes that utilize the production service 624 may be performed while a second CA certificate, such as a current CA certificate, is active in a second portion of the execution environment that is logically or physically isolated from the first portion of the execution environment 618, where the network entity 604 executing the production service 624 is located.

Referring further to FIG. 6A, the PKI service 610 includes a certificate authority 626, a certificate repository 628, and a certificate lifecycle module 630. The certificate authority 626 issues CA certificates. Additionally, the certificate authority 626 issues subordinate certificates based on CA certificates. In one example, the certificate authority 626 issues a root CA certificate. Additionally, or alternatively, the certificate authority 626 may issue a set of entity certificates from the root CA certificate. Additionally, or alternatively, the certificate authority 626 may issue one or more intermediate CA certificates from the root CA certificate. Additionally, or alternatively, the certificate authority 626 may issue one or more entity certificates from an intermediate CA certificate.

One or more CA certificates issued by the certificate authority 626 are stored in the certificate repository 628. In one example, the certificate authority 626 may generate a certificate bundle 632 that includes one or more CA certificates. The certificate authority 626 may store one or more certificate bundles 632 in the certificate repository 628. Additionally, or alternatively, the certificate repository 628 may store subordinate certificates for distribution to the execution environment. In one example, the certificate repository 628 may store a set of entity certificates issued based on a CA certificate in a certificate bundle 632 stored in the certificate repository 628.

In one example, as shown in FIG. 6A, the certificate repository 628 includes a current certificate bundle 632*a* and a new certificate bundle 632*n*. The current certificate bundle 632*a* may include a current CA certificate. The new certificate bundle 632*n* may include a new CA certificate. In one example, the new certificate bundle 632*n* may additionally include the current CA certificate. The new certificate bundle 632*n*, including the new CA certificate, may supersede the current certificate bundle 632*a* upon being distributed to the execution environment 618. When the new certificate bundle 632*n* supersedes the current certificate bundle 632*a*, the new certificate bundle becomes the current certificate bundle 632*a*. In one example, a new certificate bundle 632*n* that includes a new CA certificate and a current CA certificate may supersede a current certificate bundle that includes the current CA certificate. Subsequently, the current CA certificate included in the new certificate bundle 632*n* may be removed from the execution environment by distributing a new certificate bundle 632*n* that includes the new CA certificate and that is exclusive of (does not include) the current CA certificate.

The certificate lifecycle module 630 performs operations associated with expiration and replacement of digital certificates. The certificate lifecycle module 630 may determine that a current CA certificate is approaching expiration. In response to determining that the CA certificate is approaching expiration, the certificate lifecycle module 630 may prompt the certificate authority 626 to generate a new CA certificate that will supersede the current CA certificate. Additionally, or alternatively, the certificate lifecycle module 630 may prompt the certificate authority 626 to generate new entity certificates. The certificate authority 626 may generate new entity certificates, for example, when prompted by the certificate lifecycle module 630, to replace expiring entity certificates and/or in connection with issuance of new CA certificates.

In one example, the certificate lifecycle module 630 may maintain a data structure that identifies a certificate bundle 632 that is available for distribution to the execution environment. Additionally, or alternatively, the data structure may identify the CA certificate to be utilized by the certificate authority 626 when generating subordinate certificates. Additionally, or alternatively, the data structure may identify a set of subordinate certificates that are available for distribution to the execution environment. In one example, the data structure maintained by the certificate lifecycle module 630 may include one or more epoch dates that represent an expiry date for one or more digital certificates. When the epoch date meets a threshold date, the certificate lifecycle module 630 may trigger issuance of new digital certificates to replace the digital certificates associated with the epoch date. An epoch date may correspond to at least a portion of the execution environment. In one example, a first epoch date may correspond to a CA certificate, and a second epoch date may correspond to a set of subordinate certificates issued from the CA certificate. Additionally, or alternatively, a first epoch date may correspond to a first portion of the execution environment, and a second epoch date may correspond to a second portion of the execution environment.

The certificate lifecycle module 630 may update an epoch date corresponding to one or more digital certificates to trigger issuance of new digital certificates to replace the digital certificates corresponding to the updated epoch date. Additionally, or alternatively, the certificate lifecycle module 630 may update an epoch date corresponding to at least a portion of the execution environment to trigger issuance of new digital certificates with respect to the portion of the execution environment corresponding to the updated epoch date. In one example, the certificate lifecycle module 630 may update an epoch date corresponding to a particular set of network entities, such as a host (e.g., network entity 604a) and a set of nodes corresponding to the host (e.g., network entity 604b and network entity 604n). Additionally, or alternatively, the certificate lifecycle module 630 may update an epoch date corresponding to a particular region 608 and/or a particular availability domain 606.

In one example, the certificate lifecycle module 630 may update an epoch date in response to a prompt from the orchestration service 614. Additionally, or alternatively, the certificate lifecycle module 630 may update an epoch date in response to an input from a user input device. Additionally, or alternatively, the certificate lifecycle module 630 may update an epoch date in response to a security concern. The issuance of new digital certificates corresponding to the updated epoch date may mitigate the security concern.

The certificate distribution service 612 may distribute certificate bundles 632 and/or subordinate certificates to the execution environment. The certificate distribution service 612 may identify the certificate bundles 632 and/or subordinate certificates for distribution to the execution environment based on the data structure maintained by the certificate lifecycle module 630. In one example, one or more network entities may periodically prompt the certificate distribution service 612 for a new certificate bundle 632. When a new certificate bundle 632 is available for distribution, the certificate distribution service 612 may distribute the certificate bundle 632 to the one or more network entities in response to the periodic prompts. Additionally, or alternatively, one or more network entities may periodically prompt the certificate distribution service 612 for new subordinate certificates. When new subordinate certificates are available for distribution, the certificate distribution service 612 may distribute the new subordinate certificates to the one or more network entities in response to the periodic prompts. Additionally, or alternatively, the certificate distribution service 612 may periodically check the data structure for new certificate bundles and/or new subordinate certificates that are available for distribution and may distribute the new certificate bundles and/or new subordinate certificates to the corresponding network entities. Additionally, or alternatively, the certificate distribution service 612 may distribute certificate bundles and/or subordinate certificates in response to a prompt from the orchestration service 614.

Separate instances of a particular certificate bundle may be distributed to different network entities. The separate instances of the particular certificate bundle may include the same set of one or more CA certificates. In one example, a first instances of a first certificate may include a first set of one or more CA certificates, and a second instance of the first certificate bundle may also include the first set of one or more CA certificates. The first instance of the first certificate bundle may be distributed to a first network entity, and the second instance of the first certificate bundle may be distributed to a second network entity. Separate instances of the same CA certificate(s) may be included in both the first instance and the second instance of the first certificate bundle. Additionally, or alternatively, multiple instances of a CA certificate may be included in different certificate bundles. In one example, a first instance of a first CA certificate may be included in a first certificate bundle, and a second instance of the first CA certificate may be included in a second certificate bundle. The first instance and the second instance of the first CA certificate may be separate instances of the same CA certificate.

Referring further to FIG. 6A, the orchestration service 614 includes an orchestration agent 634, a test validation module 636, and a policy module 638. The orchestration agent 634 may orchestrate one or more certificate distribution processes. Additionally, or alternatively, the orchestration agent 634 may orchestrate one or more testing processes. In one example, the orchestration agent 634 may orchestrate one or more testing processes at one or more incremental steps of a certificate distribution process. In one example, the orchestration agent 634 may orchestrate a certificate distribution process that incrementally increases exposure to the execution environment 618 in response to successful testing processes.

The orchestration agent 634 may interact with the PKI service 610 and/or the certificate distribution service in connection with orchestration of certificate distribution processes and/or testing processes. In one example, the orchestration agent 634 prompts the PKI service 610 to issue new digital certificates. Additionally, or alternatively, the orchestration agent 634 prompts the certificate distribution service 612 to distribute the new digital certificates to the corresponding network entities 604. In one example, the orchestration agent 634 prompts the certificate lifecycle module 630 to update an epoch date to trigger issuance and/or distribution of new digital certificates.

The test validation module 636 may perform validations to validate testing processes orchestrated by the orchestration agent 634. The validations performed by the validation module 636 may correspond to one or more testing operations of a testing process. Additionally, or alternatively, the validations may correspond to the testing process as a whole. In one example, the test validation module 636 may determine whether a testing processes and/or a testing operation is successful. The orchestration agent 634 may advance to a next stage of a testing process and/or a certificate distribution process in response to an indication from the test validation module 636. The indication from the test validation module 636 may represent one or more successful testing results.

The policy module 638 may include one or more policies for certificate distribution processes and/or testing processes orchestrated by the orchestration agent 634. The one or more policies may indicate timing and/or conditions for initiating certificate distribution processes and/or testing processes. Additionally, or alternatively, the one or more policies may indicate a sequence of steps for a particular certificate distribution process and/or testing process. The orchestration agent may initiate a certificate distribution process and/or a testing process based on one or more policies in the policy module 638. Additionally, or alternatively, the orchestration agent may select a certificate distribution process and/or a testing process based on one or more policies in the policy module 638.

B. Example Execution Environments

Referring to FIG. 6B, example execution environments 618 are further described. As shown in FIG. 6B, an execution environment 618 may include a plurality of network entities 604, such as host network entity 604c, node network entity 604f, and node network entity 604m. Additionally, or alternatively, the execution environment 618 may include network entity 604a and network entity 604v shown in FIG. 6A. As illustrated with respect to host network entity 604c, a network entity 604 may include a PKI agent 650 (e.g., PKI agent 650a), a certificate downloader 652 (e.g., certificate downloader 652a), and a storage medium 654 (e.g., storage medium 654a). The PKI agent 650 periodically prompts the PKI service 610 for new certificate bundles and/or new subordinate certificates. The certificate downloader 652 downloads new certificate bundles and/or new subordinate certificates from the certificate distribution service 612. The certificate downloader 652 installs certificate bundles to the storage medium 654. Additionally, the certificate downloader 652 stores the subordinate certificates in storage medium 654.

In one example, the certificate downloader 652 distributes certificate bundles and/or subordinate certificates to other network entities 604, such as node network entity 604$f$ and/or node network entity 604$m$. The certificate downloader 652 of host network entity 604$e$ may download a first entity certificate issued to host network entity 604$e$, a second entity certificate issued to node network entity 604$f$, and a third entity certificate issued to node network entity 604$m$. The certificate downloader 652 may store the first entity certificate in the storage medium 654 associated with the host network entity 604$e$ for use by the host network entity 604$c$ when authenticating against a CA certificate in accordance with a security protocol. The certificate downloader 652 may transmit the second entity certificate to node network entity 604$f$. Node network entity 604$f$ may store the second entity certificate in a storage medium associated with node network entity 604$f$ and may utilize the second entity certificate when authenticating against a CA certificate in accordance with a security protocol. The certificate downloader 652 may transmit the third entity certificate to node network entity 604$m$. Node network entity 604$m$ may store the third entity certificate in a storage medium associated with node network entity 604$m$ and may utilize the third entity certificate when authenticating against a CA certificate in accordance with a security protocol.

i. Example Testing Services

In one example, as illustrated in FIG. 6B with respect to host network entity 604$e$, a network entity 604 may include a testing service 622. Additionally, or alternatively, as illustrated in FIG. 6B with respect to host network entity 604$e$, a network entity 604 may include a production service 624. The testing service 622 may execute testing operations corresponding to a new CA certificate that is yet to be activated in the portion of the execution environment 618 where the network entity 604 is located. The testing service 622 may execute the testing operations without impacting operations of the production service 624. The testing service 622 may include a dedicated instance of a PKI agent 650 (e.g., PKI agent 650$b$), a certificate downloader 652 (e.g., certificate downloader 652$b$), and/or a storage medium 654 (e.g., storage medium 654$b$). The testing service 622 may utilize PKI agent 650$b$, certificate downloader 652$b$, and/or storage medium 654$b$ to download certificate bundles and/or subordinate certificates to the testing service 622 without impacting operations of the production service 624. In one example, the testing service 622 may download a new certificate bundle 632$n$ (FIG. 6A) to storage medium 654$b$ while a current certificate bundle 632$a$ (FIG. 6A) is stored in storage medium 654$a$. The production service 624 may utilize the current certificate bundle 632$a$ while the testing service 622 executes testing operations corresponding to the new certificate bundle 632$n$.

ii. Example Testing Service Validations

As shown in FIG. 6B, the testing service 622 may include one or more testing modules 656, such as testing module 656$a$ and testing module 656$n$. A testing module 656 may perform one or more testing operations associated with a certificate bundle. The one or more testing operations may include one or more testing service validations. The one or more testing service validations may include validating that the testing service 622 has downloaded and installed the correct certificate bundle for testing. Additionally, or alternatively, the one or more testing service validations may include validating that the certificate bundle includes the correct set of CA certificates. A testing module 656 may validate that the testing service 622 has downloaded and installed the correct certificate bundle and/or that the certificate bundle includes the correct set of CA certificates by examining one or more file attributes of the certificate bundle and/or the CA certificates. In one example, the testing module 656 may compare a first set of file attributes corresponding to the certificate bundle and/or the CA certificates in the storage medium 654$b$ against a second set of file attributes corresponding to the certificate bundle and/or the CA certificates in the certificate repository 628 (FIG. 6A) of the PKI service 610. The testing module 656 may determine that the storage medium 654$b$ includes the correct certificate bundle and/or the correct CA certificates when the first set of file attributes matches the second set of file attributes.

Additionally, or alternatively, the testing module 656 may compute a first hash value corresponding to the certificate bundle and/or the CA certificates in the storage medium 654$b$ and compare the first hash value against a second hash value corresponding to the certificate bundle and/or the CA certificates in the certificate repository 628 (FIG. 6A) of the PKI service 610. The second hash value may be computed by the testing module 656 or by the PKI service 610. The testing module 656 may determine that the storage medium 654$b$ includes the correct certificate bundle and/or the correct CA certificates when the first hash value matches the second hash value.

Additionally, or alternatively, the testing module 656 may compare a first timestamp corresponding to the certificate bundle and/or the CA certificates in the storage medium 654$b$ against a second timestamp corresponding to the certificate bundle and/or the CA certificates in the certificate repository 628 (FIG. 6A) of the PKI service 610. The first timestamp may represent a time when the certificate bundle was downloaded by the testing service 622 or by the network entity 604 that executes the testing service 622. The second timestamp may represent a time when the certificate bundle was generated by the PKI service 610. The testing module 656 may determine that the storage medium 654$b$ includes the correct certificate bundle and/or the correct CA certificates when the first timestamp is subsequent to the second timestamp.

iii. Example Testing Service Authentications

In one example, the one or more testing operations may include one or more testing service authentications. The one or more testing service authentications may include authenticating one or more entity certificates against a CA certificate downloaded to the testing service 622. The one or more entity certificates may be authenticated against a CA certificate by a testing module 656. The one or more entity certificates may be downloaded to the testing service 622 by certificate downloader 652$b$. Additionally, or alternatively, the testing service 622 may obtain one or more entity certificates from other network entities 604 for authentication against the CA certificate downloaded to the testing service 622. The testing module 656 may determine that the certificate bundle and/or the CA certificates are configured correctly when the one or more entity certificates successfully authenticate to a CA certificate in the certificate bundle. In one example, the testing module 656 may authenticate one or more new entity certificates against a new CA certificate in a new certificate bundle to confirm that the one or more new entity certificates successfully authenticate to the new CA certificate. Additionally, or alternatively, the testing module 656 may authenticate one or more current entity certificates against a current CA certificate in a new certificate bundle to confirm that the one or more new current certificates successfully authenticate to the current CA certificate when the current CA certificate is included in the new certificate bundle. Additionally, or alternatively, a testing module 656 may validate the one or more entity certifies based on file attributes, hash values, and/or timestamps as described above with respect to certificate bundles and/or CA certificates.

iv. Example Production Service Validations

In one example, the one or more testing operations may include one or more production service validations. The one or more production service validations may include validating that a production service 624 has downloaded and installed the correct certificate bundle for testing. Additionally, or alternatively, the one or more production service validations may include validating that the certificate bundle includes the correct set of CA certificates. A production service 624 may validate that the production service 624 has downloaded and installed the correct certificate bundle and/ or that the certificate bundle includes the correct set of CA certificates by examining one or more file attributes of the certificate bundle and/or the CA certificates. In one example, the production service 624 may compare a first set of file attributes corresponding to the certificate bundle and/or the CA certificates in the storage medium 654b against a second set of file attributes corresponding to the certificate bundle and/or the CA certificates in the certificate repository 628 (FIG. 6A) of the PKI service 610. The production service 624 may determine that the storage medium 654b includes the correct certificate bundle and/or the correct CA certificates when the first set of file attributes matches the second set of file attributes.

Additionally, or alternatively, the production service 624 may compute a first hash value corresponding to the certificate bundle and/or the CA certificates in the storage medium 654b and compare the first hash value against a second hash value corresponding to the certificate bundle and/or the CA certificates in the certificate repository 628 (FIG. 6A) of the PKI service 610. The second hash value may be computed by the production service 624 or by the PKI service 610. The production service 624 may determine that the storage medium 654b includes the correct certificate bundle and/or the correct CA certificates when the first hash value matches the second hash value.

Additionally, or alternatively, the production service 624 may compare a first timestamp corresponding to the certificate bundle and/or the CA certificates in the storage medium 654b against a second timestamp corresponding to the certificate bundle and/or the CA certificates in the certificate repository 628 (FIG. 6A) of the PKI service 610. The first timestamp may represent a time when the certificate bundle was downloaded by the production service 624 or by the network entity 604 that executes the production service 624. The second timestamp may represent a time when the certificate bundle was generated by the PKI service 610. The production service 624 may determine that the storage medium 654b includes the correct certificate bundle and/or the correct CA certificates when the first timestamp is subsequent to the second timestamp.

v. Example Production Service Authentications

In one example, the one or more testing operations may include one or more production service authentications. The one or more production service authentications may include authenticating one or more entity certificates against a CA certificate downloaded to the production service 624. The one or more one or more production service authentications may be performed in connection with production operations executed by the production service 624. Additionally, or alternatively, the one or more one or more production service authentications may be performed as testing operations that are distinct from production operations executed by the production service 624. The one or more entity certificates may be authenticated against a CA certificate by the production service 624. Production service authentications may be performed as testing operations that are distinct from production operations executed by the production service 624, and the one or more entity certificates may be downloaded to the production service 624 by certificate downloader 652b. Additionally, or alternatively, the production service 624 may obtain one or more entity certificates from other network entities 604 for authentication against the CA certificate in production service authentications that are performed as production operations and/or testing operations. The production service 624 may determine that the certificate bundle and/or the CA certificates are configured correctly when the one or more entity certificates successfully authenticate to a CA certificate in the certificate bundle. In one example, the production service 624 may authenticate one or more new entity certificates against a new CA certificate in a new certificate bundle to confirm that the one or more new entity certificates successfully authenticate to the new CA certificate. Additionally, or alternatively, the production service 624 may authenticate one or more current entity certificates against a current CA certificate in a new certificate bundle to confirm that the one or more new current certificates successfully authenticate to the current CA certificate when the current CA certificate is included in the new certificate bundle. Additionally, or alternatively, the production service 624 may validate the one or more entity certifies based on file attributes, hash values, and/or timestamps as described above with respect to certificate bundles and/or CA certificates.

vi. Example Event Service Validations for Execution Environment Operations

Referring further to FIG. 6B, as illustrated with respect to host network entity 604c, a network entity 604 may include an event collector 658 (e.g., event collector 658a). An event collector 658 may collect information pertaining to events occurring with respect to the network entity 604 and transmit the information to the event monitoring service 616. The event monitoring service 616 may transmit the information to the orchestration service 614.

In one example, the event monitoring service transmits test results to the orchestration service 614. In one example, the event monitoring service 616 may generate event logs, and the orchestration service 614 may detect events in the event logs generated by the event monitoring service 616. The events in the event logs may include, or may be indicative of, the test results. In one example, the event monitoring service 616 may transmit the event logs to the orchestration service 614.

The orchestration service 614 may perform one or more testing operations based on information from the event monitoring service 616. The one or more event service validations may include one or more testing operations performed by the orchestration service 614 based on information from the event monitoring service 616.

In one example, the event service validations may be associated with testing operations performed by a testing service 622. In one example, the information from the event monitoring service 616 may indicate a testing service 622 has downloaded and installed a certificate bundle for testing, and/or a testing module 656 has successfully validated that the correct certificate bundle has been installed, and/or the certificate bundle includes the set CA certificates. Additionally, or alternatively, the orchestration service 614 may utilize the information from the event monitoring service 616 to validate the correct certificate bundle has been installed, and/or the certificate bundle includes the set CA certificates. Additionally, or alternatively, the information from the event monitoring service 616 may indicate a testing service 622 has downloaded one or more entity certificates, and/or a testing module 656 has successfully authenticated the one or more entity certificates against a corresponding CA certificate. The information from the event monitoring service 616 may include file attributes, hash values, and/or timestamps associated with certificate bundles and/or entity certificates. The orchestration service 614 may validate certificate bundles, CA certificates, and/or entity certificates based on file attributes, hash values, and/or timestamps included in the information from the event monitoring service 616.

In one example, the event service validations may be associated with testing operations performed by a production service 624. In one example, the information from the event monitoring service 616 may indicate that the production service 624 has downloaded and installed a certificate bundle, and/or the production service 624 has successfully validated that the correct certificate bundle has been installed, and/or the certificate bundle includes the set CA certificates. Additionally, or alternatively, the orchestration service 614 may utilize the information from the event monitoring service 616 to validate the correct certificate bundle has been installed for use by the production service 624, and/or the certificate bundle includes the set CA certificates. Additionally, or alternatively, the information from the event monitoring service 616 may indicate the production service 624 has downloaded one or more entity certificates, and/or a testing module 656 has successfully authenticated the one or more entity certificates against a corresponding CA certificate. The information from the event monitoring service 616 may include file attributes, hash values, and/or timestamps associated with certificate bundles and/or entity certificates. The orchestration service 614 may validate certificate bundles, CA certificates, and/or entity certificates based on file attributes, hash values, and/or timestamps included in the information from the event monitoring service 616.

C. Example Sandbox Sub-Environments

Referring to FIG. 6C, example sandbox sub-environments 620 are further described. As shown in FIG. 6C, a sandbox sub-environment 620 may include a plurality of sandbox instances 670, such as sandbox instance 670a and sandbox instance 670n. In one example, a sandbox sub-environment 620 may include different sandbox instances 670 that have a configuration that corresponds to a network entity in the execution environment 618. Additionally, or alternatively, a sandbox instance 670 may have a configuration for performing a sandbox iteration of a certificate distribution process and/or for testing the sandbox iteration of certificate distribution process without having a configuration that corresponds to a network entity 604 in the execution environment 618.

A sandbox instance 670 includes one or more sandbox services 672. For example, as shown in FIG. 6C, sandbox instance 670n includes sandbox service 672a and sandbox service 672n. The one or more sandbox services 672 may execute operations associated with performing a sandbox iteration of a certificate distribution process. Additionally, or alternatively, the one or more sandbox services 672 may execute testing operations corresponding to the sandbox iteration of the certificate distribution process. The one or more sandbox services 672 may execute the operations associated with the sandbox iteration of the certificate distribution process without impacting operations of the execution environment 618. In one example, a sandbox service 672 may have a configuration that corresponds to a production service 624 (FIG. 6A) of a network entity 604 in the execution environment 618. Additionally, or alternatively, a sandbox service 672 may have a configuration for performing the sandbox iteration of the certificate distribution process and/or for testing the sandbox iteration of certificate distribution process without having a configuration that corresponds to a production service 624 of a network entity 604 in the execution environment 618.

The sandbox sub-environment 620 may include a dedicated instance of a PKI agent 650 (e.g., PKI agent 650n), a certificate downloader 652 (e.g., certificate downloader 652n), and/or a storage medium 654 (e.g., storage medium 654n). In one example, PKI agent 650n, certificate downloader 652n, and/or storage medium 654n may be particular to sandbox instance 670n. Alternatively, PKI agent 650n, certificate downloader 652n, and/or storage medium 654n may be utilized throughout the sandbox sub-environment 620 such as by a plurality of sandbox instance 670. The sandbox instance 670n may utilize PKI agent 650b, certificate downloader 652b, and/or storage medium 654b to download certificate bundles and/or subordinate certificates to the testing service 622 without impacting operations of the execution environment 618. The sandbox iteration of the certificate distribution process may include distributing a new certificate bundle 632n (FIG. 6A) that includes a new CA certificate to the sandbox sub-environment 620, while a current certificate bundle 632a (FIG. 6A) that includes a current CA certificate is utilized in the execution environment 618. Sandbox instance 670n may download a new certificate bundle 632n (FIG. 6A) to storage medium 654n and execute one or more testing operations corresponding to the new certificate bundle 632n.

i. Example Sandbox Service Validations

A sandbox services 672 may perform one or more testing operations associated with a certificate bundle. The one or more testing operations may include one or more sandbox service validations. The one or more sandbox service validations may include validating that the sandbox instance 670 has downloaded and installed the correct certificate bundle for testing. Additionally, or alternatively, the one or more sandbox service validations may include validating that the certificate bundle includes the correct set of CA certificates. A sandbox service 672 may validate that the correct certificate bundle has been downloaded and installed, and/or the certificate bundle includes the correct set of CA certificates by examining one or more file attributes of the certificate bundle and/or the CA certificates. In one example, the sandbox service 672 may compare a first set of file attributes, corresponding to the certificate bundle and/or the CA certificates in the storage medium 654n of the sandbox instance 670n, against a second set of file attributes, corresponding to the certificate bundle and/or the CA certificates in the certificate repository 628 (FIG. 6A) of the PKI service 610. The sandbox service 672 may determine that the storage medium 654n includes the correct certificate bundle and/or the correct CA certificates when the first set of file attributes matches the second set of file attributes.

Additionally, or alternatively, a sandbox service 672 may compute a first hash value corresponding to the certificate bundle and/or the CA certificates in the storage medium 654*n* of the sandbox instance 670*n* and compare the first hash value against a second hash value corresponding to the certificate bundle and/or the CA certificates in the certificate repository 628 (FIG. 6A) of the PKI service 610. The second hash value may be computed by the sandbox service 672 or by the PKI service 610. The sandbox service 672 may determine that the storage medium 654*n* includes the correct certificate bundle and/or the correct CA certificates when the first hash value matches the second hash value.

Additionally, or alternatively, a sandbox service 672 may compare a first timestamp corresponding to the certificate bundle and/or the CA certificates in the storage medium 654*n* of the sandbox instance 670*n* against a second timestamp corresponding to the certificate bundle and/or the CA certificates in the certificate repository 628 (FIG. 6A) of the PKI service 610. The first timestamp may represent a time when the certificate bundle was downloaded by the sandbox service 672 or the sandbox instance 670*n* executing the sandbox service 672. The second timestamp may represent a time when the certificate bundle was generated by the PKI service 610. The sandbox service 672 may determine that the storage medium 654*n* includes the correct certificate bundle and/or the correct CA certificates when the first timestamp is subsequent to the second timestamp.

ii. Example Sandbox Service Authentications

In one example, the one or more testing operations may include one or more sandbox service authentications. The one or more sandbox service authentications may include authenticating one or more entity certificates against a CA certificate downloaded to the sandbox instance 670*n*. The one or more entity certificates may be authenticated against a CA certificate by a sandbox service 672. The one or more entity certificates may be downloaded to the sandbox instance 670*n* by certificate downloader 652*n*. The certificate downloader 652*n* may store the one or more entity certificates in storage medium 654*n*. The sandbox service 627 may obtain the one or more entity certificates from the storage medium 654*n* for authentication against the CA certificate. Additionally, or alternatively, the sandbox service 672 may obtain one or more entity certificates from other sandbox services 672 and/or from other sandbox instances 670 for authentication against the CA certificate downloaded to sandbox instance 670*n*. The sandbox service 672 may determine the certificate bundle and/or the CA certificates are configured correctly when the one or more entity certificates successfully authenticate to a CA certificate in the certificate bundle. In one example, the sandbox service 672 may authenticate one or more new entity certificates against a new CA certificate in a new certificate bundle to confirm the one or more new entity certificates successfully authenticate to the new CA certificate. Additionally, or alternatively, the sandbox service 672 may authenticate one or more current entity certificates against a current CA certificate in a new certificate bundle to confirm the one or more new current certificates successfully authenticate to the current CA certificate when the current CA certificate is included in the new certificate bundle. Additionally, or alternatively, the sandbox service 672 may validate the one or more entity certifies based on file attributes, hash values, and/or timestamps as described above with respect to certificate bundles and/or CA certificates.

iii. Example Event Service Validations for Sandbox Sub-Environment Operations

Referring further to FIG. 6C, as illustrated with respect to sandbox instance 670*n*, a sandbox instance 670 may include an event collector 658 (e.g., event collector 658*n*). An event collector 658 may collect information pertaining to events occurring with respect to the sandbox instance 670 and transmit the information to the event monitoring service 616. The event monitoring service 616 may transmit the information to the orchestration service 614. The orchestration service 614 may perform one or more testing operations based on information from the event monitoring service 616. The one or more event service validations may include one or more testing operations performed by the orchestration service 614 based on information from the event monitoring service 616.

In one example, the event service validations may be associated with testing operations performed by a sandbox service 672. In one example, the information from the event monitoring service 616 may indicate the sandbox instance 670 has downloaded and installed a certificate bundle for testing, and/or a sandbox service 672 has successfully validated that the correct certificate bundle has been installed, and/or the certificate bundle includes the set CA certificates. Additionally, or alternatively, the orchestration service 614 may utilize the information from the event monitoring service 616 to validate the correct certificate bundle has been installed, and/or the certificate bundle includes the set CA certificates. Additionally, or alternatively, the information from the event monitoring service 616 may indicate a sandbox instance 670 has downloaded one or more entity certificates, and/or a sandbox service 672 has successfully authenticated the one or more entity certificates against a corresponding CA certificate. The information from the event monitoring service 616 may include file attributes, hash values, and/or timestamps associated with certificate bundles and/or entity certificates. The orchestration service 614 may validate certificate bundles, CA certificates, and/or entity certificates based on file attributes, hash values, and/or timestamps included in the information from the event monitoring service 616.

D. Example Network Entities

Referring again to FIG. 6A, the system 600 may include a plurality of network entities 604. The network entities 604 may be located throughout the virtual cloud network 602. A network entity 604 may reside on a substrate network, an overlay network, or a network interface. A network entity 604 may be implemented in hardware and/or software. A network entity may include a host, a node, an agent, a service, a component, an endpoint, or other element. The plurality of network entities 604 may include one or more substrate entities, one or more interface entities, and/or one or more overlay entities.

As used herein, the term "substrate entity" refers to a network entity 604 implemented in a substrate network. As used herein, the term "substrate network" refers to a physical network infrastructure. The substrate network provides a foundation of a virtual cloud network. The substrate network may include physical network devices, such as routers, switches, network links, and other networking components. The substrate network may provide the basic connectivity and transport capabilities necessary for data transmission within and between data centers.

The one or more substrate entities may include substrate hosts, routers, firewalls appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts and/or one or more substrate services. In one example, a substrate host may include a bare metal host. In one example, a substrate service may include a firmware service. The substrate entities may communicate with one another, and/or with other network entities 604 using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface or an interface service executing or executable on the network interface. A node on the network interface may include a programmable hardware component, a memory component, or a gateway component. In one example, a network interface may include a network interface card such as a smartNIC. Additionally, or alternatively, a network interface may include a node or an endpoint on a network interface card or smartNIC.

A gateway component may provide connectivity between the substrate network and the network interface and/or between the network interface and the overlay network. For example, a gateway component may enable communication between overlay entities and substrate entities. Additionally, or alternatively, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking (SDN), virtualization, tunneling, and/or encapsulation technologies. An overlay network may operate independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or alternatively, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service such as a service installed by a client. Additionally, or alternatively, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interacts with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts that act as consumers or clients of those resources or services.

The plurality of network entities 604 may include a plurality of data repositories. The data repositories may include any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. The data repositories may share one or more storage units with one another. Additionally, or alternatively, the data repositories may include one or more storage units that differ from one another. Further, one or more of the data repositories may be implemented or executed on the same computing system as virtual cloud network 602. Additionally, or alternatively, one or more of the data repositories may be implemented or executed on a computing system separate from virtual cloud network 602.

In one or more embodiments, the system 600 may include more or fewer components than the components illustrated in FIGS. 6A-6C. The components illustrated in FIGS. 6A-6C may be local to or remote from one another. The components illustrated in FIGS. 6A-6C may include software and/or hardware components. Components may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices.

The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

6. Example Certificate Distribution Processes

Figure 7A:
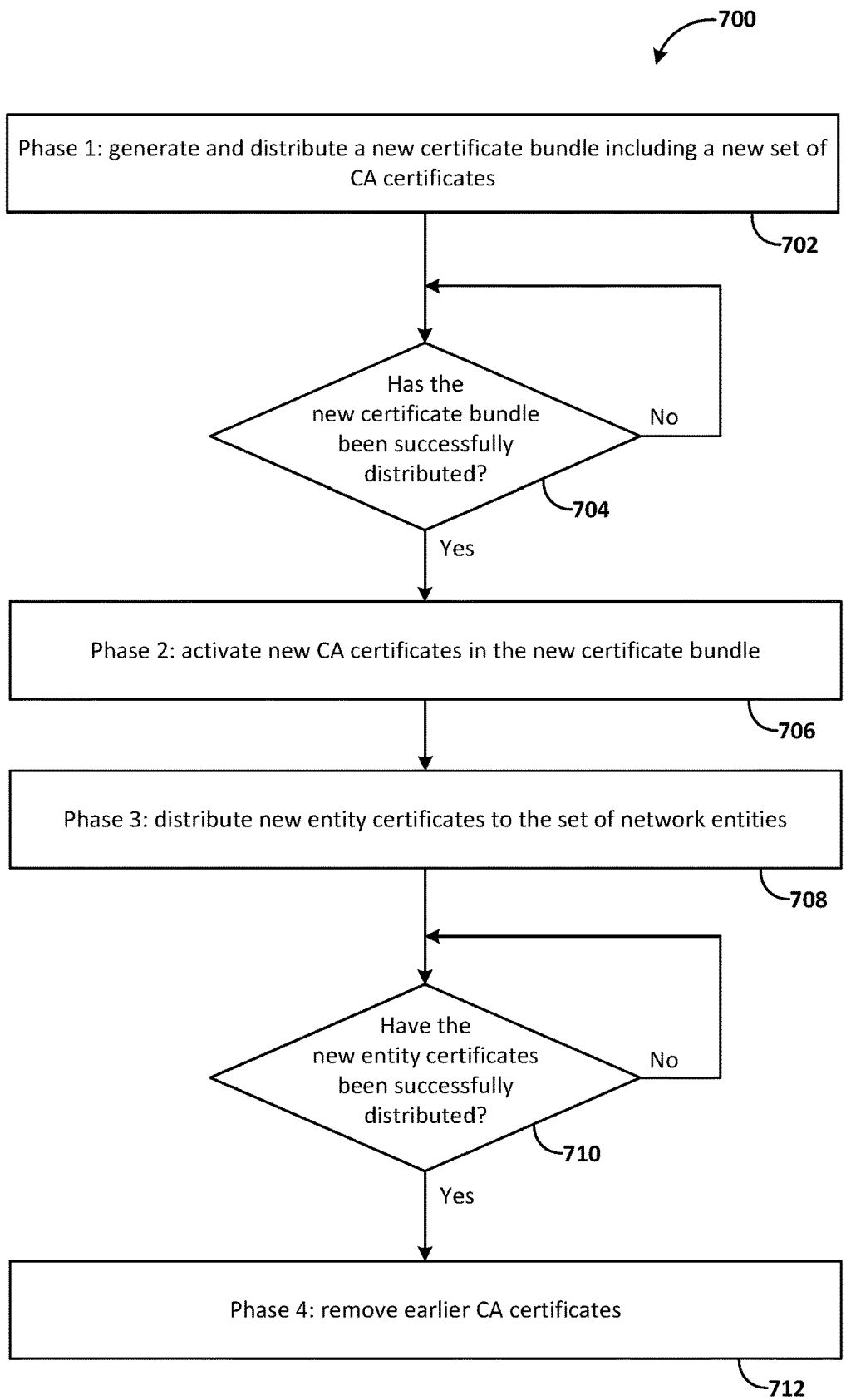
FIGS. 7A-7C are flowcharts that illustrate example operations pertaining to an example certificate distribution process in accordance with one or more embodiments.
Figure 7B:
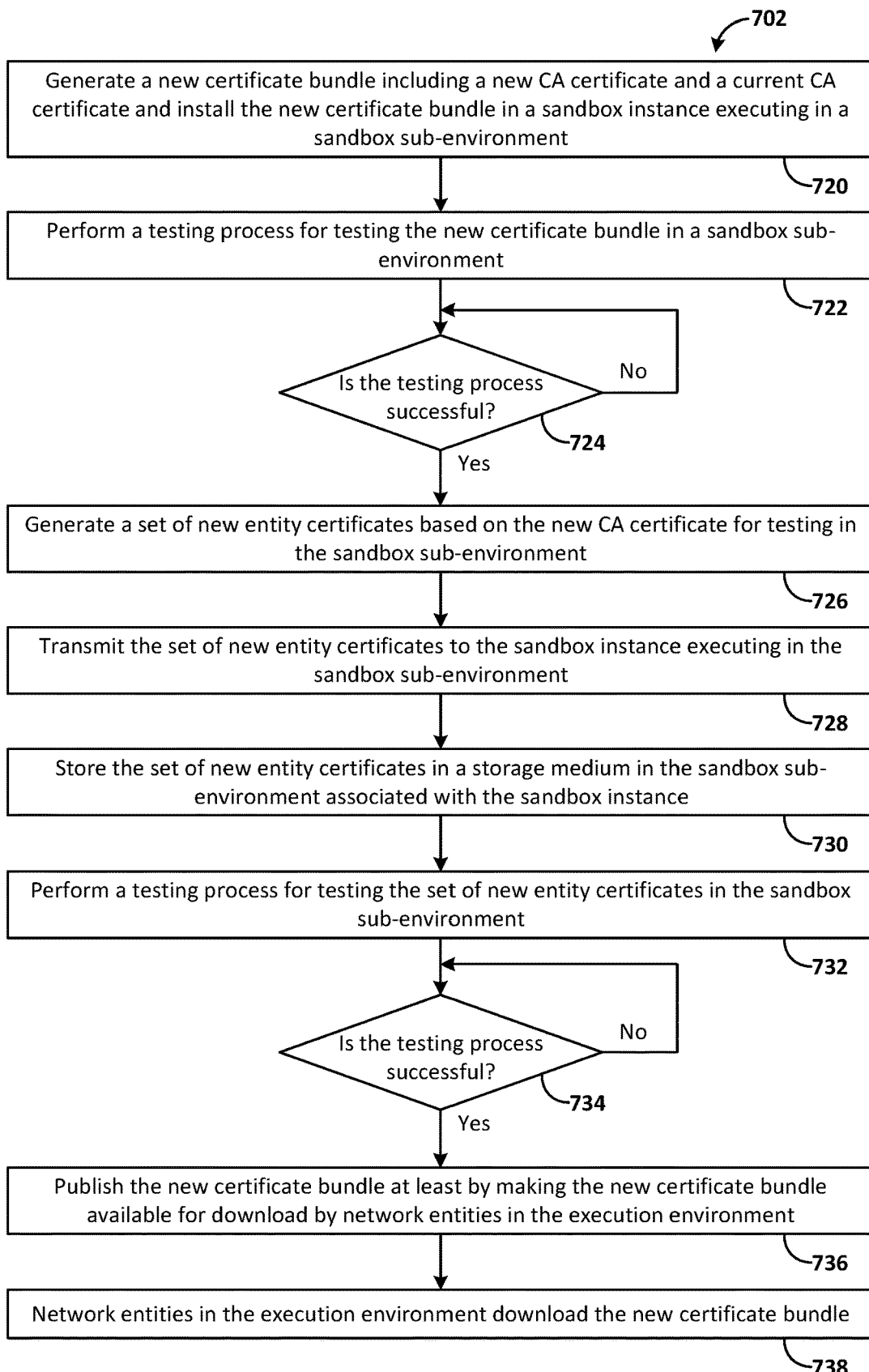
Figure 7C:
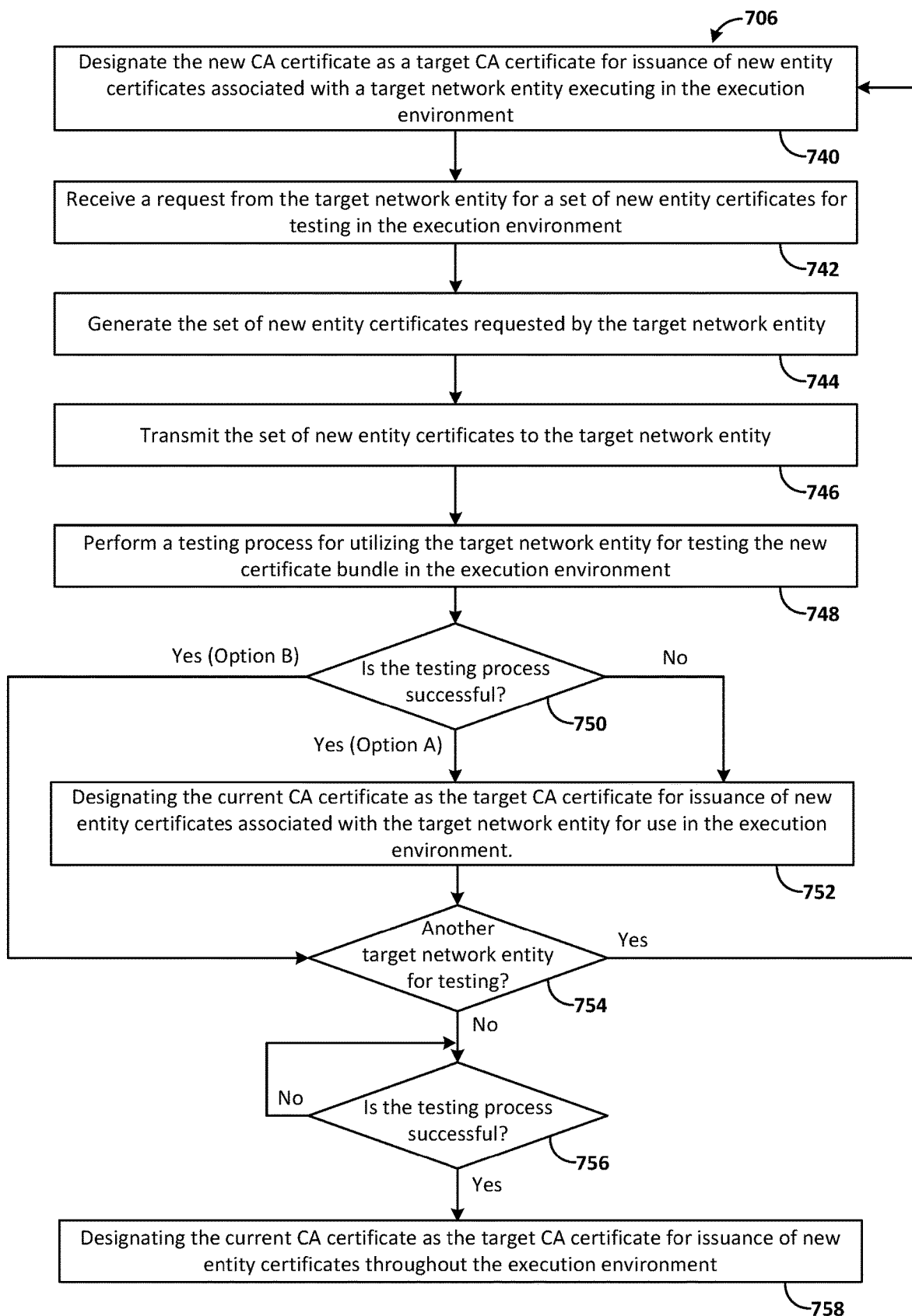

Referring now to FIGS. 7A-7C, operations pertaining to an example certificate distribution process are further described. The operations 700 described with reference to FIGS. 7A-7C may be associated with distributing a new set of one or more CA certificates to a plurality of network entities for use in a certificate authentication process. The CA certificates may include root CA certificates and/or intermediate CA certificates. The CA certificates may be housed in a certificate bundle. One or more operations 700 illustrated in FIGS. 7A-7C may be modified, rearranged, or omitted. Accordingly, the particular sequence of operations 700 illustrated in FIGS. 7A-7C should not be construed as limiting the scope of one or more embodiments. As shown in FIG. 7A, operations 700 pertaining to the certificate distribution process may include a series or sequence of phases. In one example, as shown, the operations 700 include a series or sequence of phases such as four (4) phases. In another example, the series or sequence of phases may include more or less than four (4) phases, for example, including at least a portion of the phases shown in FIG. 7A.

In one example, the certificate distribution process may be orchestrated by an orchestration service. In one example, the certificate distribution process may be executed in response to a trigger condition. The trigger condition may be determined based on at least one of the following: an expiry date of a certificate bundle and/or a CA certificate, a security alert, or an operator input. The trigger condition may be detected by the orchestration service.

In one example, prior to executing the certificate distribution process, the orchestration service may determine whether another certificate distribution process is taking place. Additionally, or alternatively, the orchestration service may determine whether any certificate distribution processes are inactive prior to commencing a certificate distribution process. In one example, the orchestration service may determine whether a certificate distribution process is taking place with respect to a first portion of the virtual cloud network prior to commencing a certificate distribution process with respect to the first portion of the virtual cloud network. In response to determining that any certificate distribution processes are inactive, the orchestration service may execute the certificate distribution process.

Referring to FIG. 7A, the operations 700 include, at block 702, generating and distributing a new certificate bundle including a new set of one or more CA certificates to a set of network entities associated with a virtual cloud network. The new set of one or more CA certificates may include at least one new CA certificate. Additionally, or alternatively, a set of new CA certificates may be added to existing certificate bundles.

At block 704, the operations 700 include determining whether the new certificate bundle has been successfully distributed. When the new certificate bundle has been successfully distributed, the operations 700 may proceed to a next phase in the distribution process. The operation at block 702 and/or 704 may represent Phase 1 of a certificate distribution process.

In one example, the operations 700 include, at block 706, activating the new CA certificates in the new certificate bundle. In one example, activating the new CA certificate may include the PKI service issuing one or more entity certificates. The operation at block 706 may represent Phase 2 of a certificate distribution process. The new CA certificate may be activated in at least a portion of the execution environment. In one example, the new CA certificate may be sequentially activated in a plurality of portions of the execution environment.

The orchestration service may activate the new CA certificate by designating the new CA certificate as a target CA certificate for issuing new entity certificates in the portion of the execution environment where the new CA certificate is being activated. The orchestration service may instruct the certificate lifecycle module to designate the new CA certificate as the target CA certificate for issuing new entity certificates, and the certificate lifecycle module may update a data structure to indicate that the new CA certificate is designated as the target CA certificate. In one example, the certificate lifecycle module may update an epoch date corresponding to the target network entity. The new CA certificate may be designated as the target CA certificate with respect to the portion of the execution environment where the new CA certificate is being activated. In one example, the new CA certificate is designated as the target CA certificate with respect to a host network entity and a set of node network entities serviced by the host network entity. The designation of the new CA certificate as the target CA certificate may activate the CA certificate in at least a portion of the execution environment.

In one example, the operations 700 include, at block 708, distributing new entity certificates to the set of network entities. At block 710, the operations 700 include determining whether the new entity certificates have been successfully distributed. Additionally, or alternatively, the operations may include determining whether the new intermediate CA certificates have been successfully distributed. When the new entity certificates (and/or the new intermediate CA certificates) have been successfully distributed, the operations 700 may proceed to a next phase in the distribution process. The operation at block 708 and 710 may represent Phase 3 of a certificate distribution process.

The new entity certificates may be distributed to network entities in at least a portion of the execution environment corresponding to the activation of the new CA certificate at block 706. In one example, the CA certificate may be sequentially activated in a plurality of portions of the execution environment corresponding to activation of the new CA certificate at block 706.

In one example, the operations 700 include, at block 712, removing earlier CA certificates that were distributed prior to the new CA certificates. For example, the earlier CA certificates may include CA certificates that are being superseded by the new CA certificates. Removing an earlier CA certificate with respect to a particular network entity may include deleting the earlier CA certificate from a storage medium associated with the particular network entity. For example, the operations 700 include transmitting, to the particular network entity, an instruction to delete the earlier CA certificate from the storage medium. In response to receiving the instruction, the particular network entity may delete the earlier CA certificate from the storage medium.

Additionally, or alternatively, removing an earlier CA certificate with respect to a network entity may include replacing a first new certificate bundle with a second new certificate bundle. The first new certificate bundle includes the new CA certificates and the earlier CA certificates, and the second new certificate bundle includes the new CA certificates and does not include the earlier CA certificates, effectively removing the earlier CA certificates from the first new certificate bundle. The second new certificate bundle may be distributed to the particular network entity and installed in the storage medium associated with the particular network entity, and the first new certificate bundle may be deleted from the storage medium. The operation at block 712 may represent Phase 4 of a certificate distribution process.

Referring to FIG. 7B, example operations 700 associated with distributing a new certificate bundle, at block 702 of FIG. 7A, are further described. As shown in FIG. 7B, the operations 700 include, at block 720, generating a new certificate bundle including a new CA certificate and a current CA certificate, and installing the new certificate bundle in a sandbox instance executing in a sandbox sub-environment. The new certificate bundle may be generated by a PKI service. A certificate downloader may receive the new certificate bundle and install the new certificate bundle in a storage medium associated with the sandbox instance.

At block 722, the operations 700 include performing a testing process for testing the new certificate bundle in a sandbox sub-environment. The testing process may include at least a portion of the testing process described with reference to FIGS. 8A-8C. Additionally, or alternatively, the testing process may include one or more of the testing operations described with reference to FIG. 9A. In one example, the testing process at block 722 includes one or more sandbox service validations and/or one or more event service validations.

At block 724, the operations 700 include determining whether the testing process performed at block 722 is successful. When the orchestration service determines that the testing process performed at block 722 is successful, the operations may proceed to block 726. When the orchestration service determines that the testing process performed at block 722 is unsuccessful, the orchestration service may generate an alert, and/or the orchestration service may suspend or abort the certificate distribution process. Additionally, or alternatively, the orchestration service may initiate a troubleshooting process to determine one or more reasons for the unsuccessful testing process.

At block 726, the operations 700 include generating a set of new entity certificates based on the new CA certificate for testing in the sandbox sub-environment. The certificate authority of the PKI infrastructure may generate the new entity certificates. In one example, the new entity certificates include sample entity certificates. The sample entity certificates may be representative of a set of one or more types of network entities executing in the execution environment and/or that may be instantiated in the execution environment. The sample entity certificates may represent the types of entity certificates that may be issued based on the new CA certificate when the new CA certificate is activated in the execution environment. Additionally, or alternatively, the new entity certificates may include entity certificates corresponding to one or more network entities in particular. For example, the certificate authority may generate entity certificates for one or more particular network entities for use in the testing process performed in the sandbox sub-environment.

At block 728, the operations 700 include transmitting the set of new entity certificates to a sandbox instance executing in the sandbox sub-environment. The certificate distribution service may transmit the set of new entity certificates to the sandbox instance. At block 730, the operations 700 include storing the set of new entity certificates in a storage medium in the sandbox sub-environment associated with the sandbox instance. The certificate downloader may receive and/or download the set of new entity certificates and store the set of new entity certificates in the storage medium associated with the sandbox instance.

At block 732, the operations 700 include performing a testing process for testing the set of new entity certificates in the sandbox sub-environment. The testing process may include at least a portion of the testing process described with reference to FIGS. 8A-8C. Additionally, or alternatively, the testing process may include one or more of the testing operations described with reference to FIG. 9A. In one example, the testing process at block 732 includes one or more sandbox service validations and/or one or more event service validations. Additionally, or alternatively, the testing process at block 732 may include one or more sandbox service authentications.

At block 734, the operations 700 include determining whether the testing process performed at block 732 is successful. When the orchestration service determines that the testing process performed at block 732 is successful, the operations may proceed to block 736. When the orchestration service determines that the testing process performed at block 732 is unsuccessful, the orchestration service may generate an alert, and/or the orchestration service may suspend or abort the certificate distribution process. Additionally, or alternatively, the orchestration service may initiate a troubleshooting process to determine one or more reasons for the unsuccessful testing process.

At block 736, the operations 700 include publishing the new certificate bundle. The new certificate bundle may be published at least by making the new certificate bundle available for download by network entities in the execution environment. The new certificate bundle may be stored in a certificate repository for download by network entities in the execution environment. Additionally, a certificate lifecycle module may update a data structure to indicate that the certificate bundle is available for distribution to the execution environment.

In one example, the orchestration service may initiate installation of the new certificate bundle in the execution environment, for example, by making the new certificate bundle available for download by network entities in the execution environment. The installation of the new certificate bundle may be initiated in response to determining that the one or more testing operations are successful, at block 734. Additionally, or alternatively, when the orchestration service determines that the one or more testing operations are unsuccessful, the orchestration service may refrain from initiating installation of the new certificate bundle in the execution environment.

At block 738, the operations 700 include network entities in the execution environment downloading the new certificate bundle. A network entity that downloads the new certificate bundle may install the new certificate bundle in a storage medium associated with the network entity.

Referring to FIG. 7C, example operations 700 associated with activating CA certificates in a new certificate bundle, at block 706 of FIG. 7A, are further described. As shown in FIG. 7C, the operations 700 include, at block 740, designating the new CA certificate as a target CA certificate for issuing new entity certificates associated with a target network entity executing in the execution environment. The orchestration service may provide an instruction to the certificate lifecycle module to designating the new CA certificate as the target CA certificate for issuing new entity certificates, and the certificate lifecycle module may update a data structure to indicate that the new CA certificate is designated as the target CA certificate. In one example, the certificate lifecycle module may update an epoch date corresponding to the target network entity. The new CA certificate may be designated as the target CA certificate with respect to a portion of the execution environment. In one example, the new CA certificate is designated as the target CA certificate with respect to a host network entity and a set of node network entities serviced by the host network entity. The designation of the new CA certificate as the target CA certificate may activate the CA certificate in at least a portion of the execution environment.

At block 742, the operations 700 include receiving a request from the target network entity for a set of new entity certificates for testing in the execution environment. A PKI agent of the target network entity may transmit the request for the set of new entity certificates to a PKI service. At block 744, the operations 700 include generating the set of new entity certificates requested by the target network entity. The PKI service may generate the set of new entity certificates. In one example, the PKI service may generate the set of new entity certificates in response to the request from the PKI agent. Additionally, or alternatively, the new entity certificates may be generated by the PKI service prior to receiving the request from the PKI agent. At block 746, the operations 700 include transmitting the set of new entity certificates to the target network entity. The certificate distribution service may transmit the new entity certificates to the target network entity. A certificate downloader associated with the target network entity may receive and/or download the set of new entity certificates and store the set of new entity certificates in a storage medium associated with the target network entity.

At block 748, the operations 700 include performing a testing process for utilizing the target network entity for testing the new certificate bundle in the execution environment.

The testing process may include at least a portion of the testing process described with reference to FIGS. 8A-8C. Additionally, or alternatively, the testing process may include one or more of the testing operations described with reference to FIGS. 9B and/or 9C. In one example, the testing process at block 748 includes one or more testing service validations and/or one or more testing service authentications. Additionally, or alternatively, the testing process at block 748 may include one or more production service validations and/or one or more production service authentications. Additionally, or alternatively, the testing process at block 732 may include one or more event service validations.

At block 750, the operations 700 include determining whether the testing process preformed at block 748 is successful. When the orchestration service determines that the testing process preformed at block 748 is successful, in one example, the operations may proceed to block 752 (Option A). Additionally, or alternatively, when the orchestration service determines that the testing process preformed at block 748 is successful, the operations may proceed to block 754 (Option B). When the orchestration service determines that the testing process preformed at block 748 is unsuccessful, the orchestration service may generate an alert, and/or the orchestration service may suspend or abort the certificate distribution process. In one example, the operations may proceed to block 752 when the orchestration service determines that the testing process performed at block 748 is unsuccessful. Additionally, or alternatively, the orchestration service may initiate a troubleshooting process to determine one or more reasons for the unsuccessful testing process.

At block 752, the operations 700 include designating the current CA certificate as the target CA certificate for issuing new entity certificates associated with the target network entity for use in the execution environment. The operations at block 752 may reverse the operations at block 740 that designated the new CA certificate as a target CA certificate. When the testing process performed at block 748 is unsuccessful, the current CA certificate is designated as the target CA certificate at block 752, so new entity certificates will be generated based on the current CA certificate and transmitted to the target network entity. The target network entity may utilize the new entity certificates to continue executing operations in the execution environment, for example, following the suspending or aborting of the certificate distribution process and/or during the troubleshooting process. When, at block 750, the testing process performed at block 748 is determined successful, in one example (Option A), the current CA certificate is designated as the target CA certificate at block 752, so new entity certificates will be generated based on the current CA certificate and transmitted to the target network entity. The target network entity may utilize the new entity certificates to continue executing operations in the execution environment, for example, while the testing process is performed with respect to other network entities. The certificate lifecycle module may update the data structure to indicate that the current CA certificate is designated as the target CA certificate. The update to the data structure at block 752 may reverse the update to the data structure at block 740.

At block 754, the operations 700 include determining whether or not to perform the testing process with respect to another target network entity. When the orchestration service determines that the testing process will be performed with respect to another target network entity, the operations may return to block 740. When the orchestration service determines that the testing processes are complete, the operations 700 may proceed to block 756.

In one example, when the orchestration service determines at block 750 that the testing process performed at block 748 with respect to a first portion of the execution environment is successful, and the operations proceed to block 754 (Option B), the operations 700 may include utilizing the new CA certificate as the target CA certificate for issuing new entity certificates to network entities in the first portion of the execution environment. The new CA certificate may be activated in the first portion of the execution environment by designating the new CA certificate as the target CA certificate for issuing new entity certificates to network entities in the first portion of the execution environment. The PKI service may generate new entity certificates for the network entities in the first portion of the execution environment that were not issued a new entity certificate for authentication against the new CA certificate at block 740. The network entities in the first portion of the execution environment may utilize the new entity certificates to authenticate against the new CA certificate in accordance with a security protocol associated with production operations in the execution environment.

Additionally, or alternatively, when the orchestration service determines at block 750 that the testing process performed at block 748 with respect to a first portion of the execution environment is successful, and the operations proceed to block 754 (Option B), the operations 700 may include initiating activation of the new CA certificate in a second portion of the execution environment. The orchestration service may initiate activation of the new CA certificate in a second portion of the execution environment by designating the new CA certificate as the target CA certificate for issuing new entity certificates to network entities in the execution environment. The PKI service may generate new entity certificates for the network entities in the second portion of the execution environment, and the network entities in the second portion of the execution environment may utilize the new entity certificates to authenticate against the new CA certificate in accordance with a security protocol associated with production operations in the execution environment.

At block 756, the operations 700 include determining whether the testing processes performed at block 748 with respect to one or more of the iterations of target network entities were successful. When the orchestration service determines that the testing processes performed at block 748 were successful, the operations may proceed to block 758. When the orchestration service determines, at block 750, that one or more of the testing process performed at block 748 were unsuccessful, the orchestration service may generate an alert, and/or the orchestration service may suspend or abort the certificate distribution process. Additionally, or alternatively, the orchestration service may initiate a troubleshooting process to determine one or more reasons for the unsuccessful testing process.

At block 758, the operations 700 include designating the current CA certificate as the target CA certificate for issuing new entity certificates throughout the execution environment. In one example, the orchestration service may initiate activation of the current CA certificate by designating the current CA certificate as the target CA certificate for issuing new entity certificates throughout the execution environment. The orchestration service may initiate activation of the current CA certificate in response to determining that the set of one or more testing operations are successful at block 750 and/or at block 756. Additionally, or alternatively, in response to determining that the set of one or more testing operations are unsuccessful at block 750 and/or at block 756, the orchestration service may refrain from initiating activation of the new CA certificate. Additionally, or alternatively, in response to determining that the set of one or more testing operations are unsuccessful at block 750 and/or at block 756, the orchestration service may revert back to the current CA certificate, for example, by designating the current CA certificate as the target CA certificate for issuing new entity certificates associated with the target network entity for use in the execution environment.

The certificate lifecycle module may update the data structure to indicate that the new CA certificate is designated as the target CA certificate for issuing new entity certificates throughout the execution environment. The update to the data structure at block 752 may reverse an update to the data structure at block 752. Additionally, or alternatively, the update to the data structure at block 752 may designate additional network entities (e.g., network entities that were not included in a testing process at block 748) for receiving new entity certificates issued from the new CA certificate.

By designating the new CA certificate as the target CA certificate for issuing new entity certificates throughout the execution environment, the PKI service may generate new entity certificates from the new CA certificate in response to requests from PKI agents throughout the execution environment. A new entity certificate generated based on the new CA certificate may be distributed to one or more network entities that do not already have a new entity certificate. In one example, a new entity certificate generated based on the new CA certificate may be distributed to one or more network entities that were not included in a testing process at block 748. Additionally, or alternatively, a new entity certificate generated based on the new CA certificate may be distributed to one or more network entities that received an entity certificate issued based on the current CA certificate subsequent to a testing process at block 752.

6. Example Testing Processes

Figure 8A:
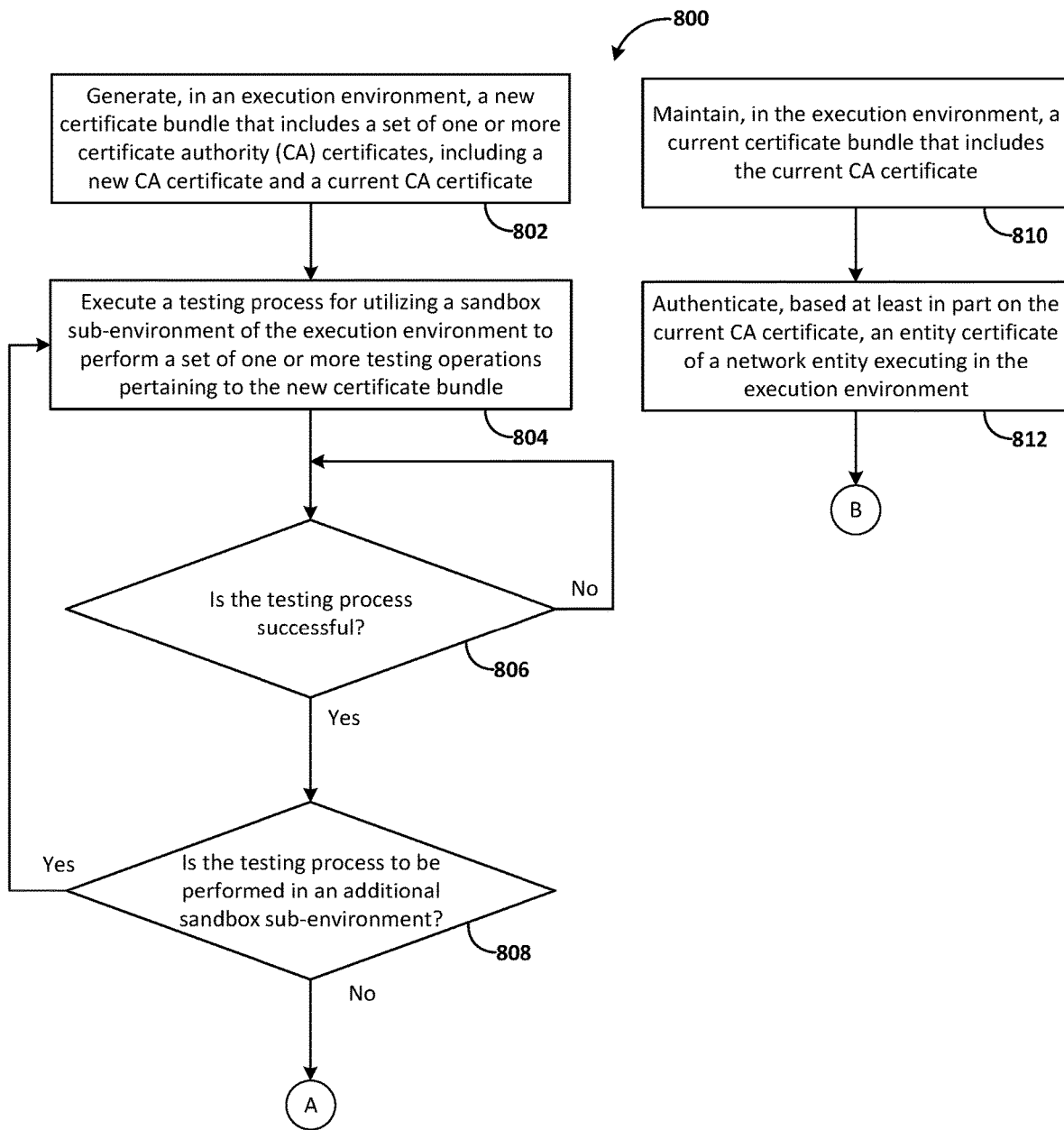
FIGS. 8A-8C are flowcharts that illustrate example operations pertaining to testing processes that may be executed in connection with a certificate distribution process in accordance with one or more embodiments.
Figure 8B:
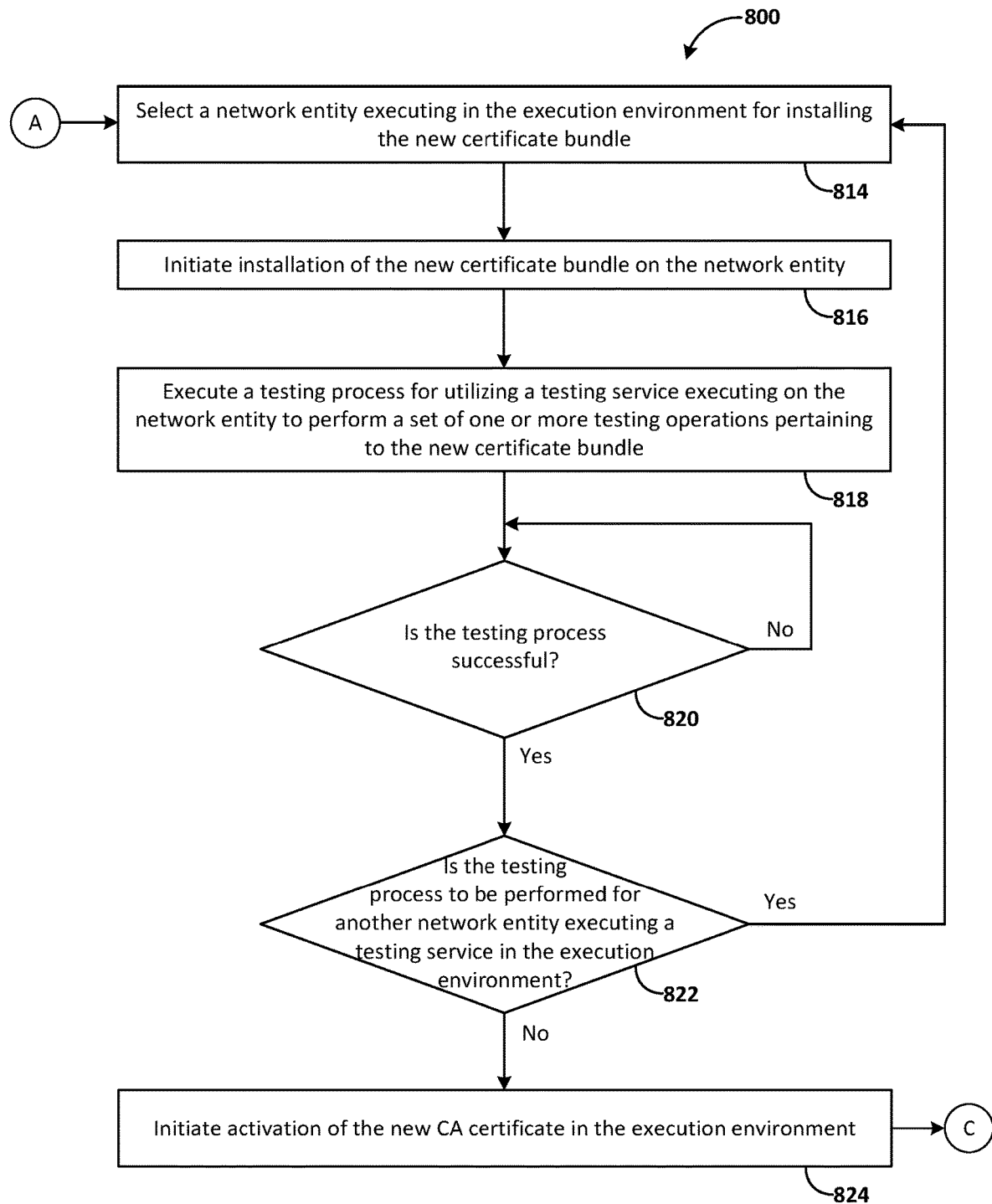
Figure 8C:
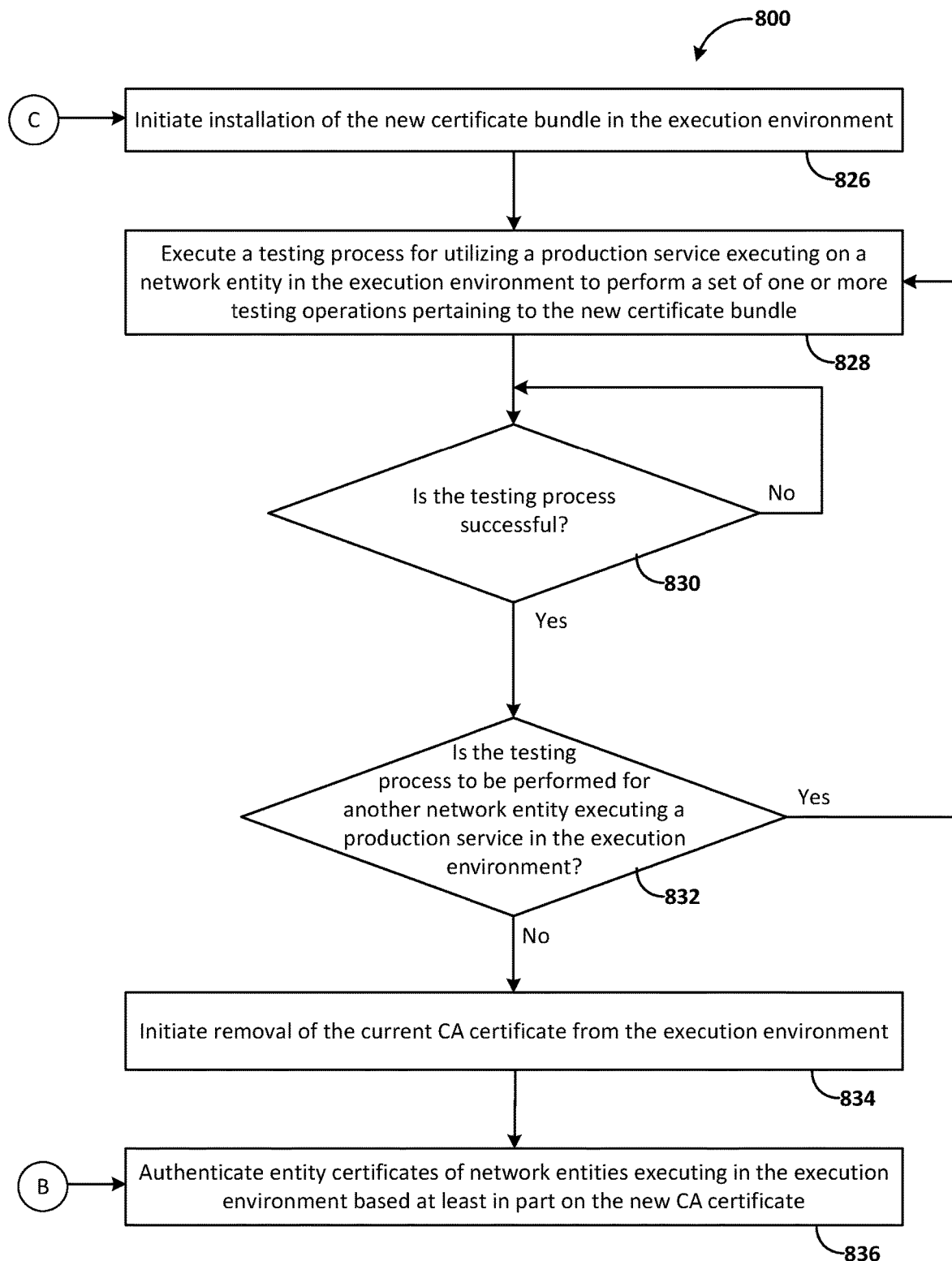

Referring to FIGS. 8A-8C, example operations 800 pertaining to testing processes that may be executed in connection with a certificate distribution process are further described. One or more operations 800 described with reference to FIGS. 8A-8C may be modified, combined, rearranged, or omitted. Accordingly, the particular sequence of operations 800 described with reference to FIGS. 8A-8C should not be construed as limiting the scope of one or more embodiments. In one example, the operations described with reference to FIGS. 8A-8C may include one or more operations 700 described with reference to FIGS. 7A-7C. In one example, the operations 800 may be performed by the one or more components of the system described with reference to FIGS. 6A-6C.

Referring to FIG. 8A, the operations 800 include, at block 802, generating a new certificate bundle in an execution environment of a virtual cloud network. The new certificate bundle may include a set of one or more CA certificates. The set of one or more CA certificates may include a new CA certificate and a current CA certificate. Generating the new certificate bundle may be initiated by an orchestration service. The new certificate bundle may be generated by a PKI service in response to a command from the orchestration service. Generating the new certificate bundle may include transmitting a command from the orchestration service to the PKI service to cause the PKI service to generate the new certificate bundle.

At block 804, the operations 800 include executing a testing process for utilizing a sandbox sub-environment of the execution environment to perform a set of one or more testing operations pertaining to the new certificate bundle. The testing process may include one or more of the testing operations described with reference to FIG. 9A. In one example, the testing process at block 804 includes one or more sandbox service validations and/or one or more event service validations. Additionally, or alternatively, the testing process at block 804 may include one or more sandbox service authentications. The testing process may be initiated by the orchestration service. A sandbox instance executing in the sandbox sub-environment may execute at least a portion of the testing process. The testing process may include transmitting a command from the orchestration service to the sandbox instance to cause the sandbox instance to execute the testing process. Additionally, or alternatively, the testing process may include the orchestration service receiving test results from the sandbox instance and/or from the event monitoring service. Additionally, or alternatively, the orchestration service may detect events in an event log generated by the event monitoring service, and the events may be indicative of the test results.

At block 806, the operations 800 include determining whether the testing process executed in the sandbox sub-environment at block 804 is successful. When the orchestration service determines that the testing process executed in the sandbox sub-environment is successful, the operations 800 may proceed to block 808. When the orchestration service determines that the sandbox sub-environment testing process is unsuccessful, the system may abort the operations 800, or the system may suspend the operations 800, for example, until the system determines that the sandbox sub-environment testing process is successful. In one example, one or more alerts may be generated in response to determining that the sandbox sub-environment testing process is unsuccessful. One or more troubleshooting operations may be initiated in response to the one or more alerts.

At block 808, the operations 800 include determining whether the testing process is to be performed in an additional sandbox sub-environment. When the orchestration service determines that the testing process is to be performed in an additional sandbox sub-environment, the operations 800 may return to block 804, where the testing process may be executed in the additional sandbox sub-environment. When the orchestration service determines that the testing process is not to be performed in an additional sandbox sub-environment, the operations 800 may proceed to block 814 of FIG. 8B. In one example, the operations 800 may proceed to block 814 of FIG. 8B upon having executed the testing process with respect to a set of one or more sandbox sub-environments. Additionally, or alternatively, the operations 800 may proceed to block 814 of FIG. 8B concurrently with executing the testing process in the additional sandbox sub-environment.

In one example, the operations 800 include, at block 810, maintaining, in the execution environment, a current certificate bundle that includes the current CA certificate. The current certificate bundle including the current CA certificate may be maintained in the execution environment concurrently with execution of the testing process in the sandbox sub-environment. In one example, the operations 800 include, at block 812, authenticating, based at least in part on the current CA certificate of the current certificate bundle, an entity certificate of a network entity executing in the execution environment. The entity certificate may be authenticated against the current CA certificate in connection with one or more production operations executed by a production service in the execution environment. The entity certificate may be authenticated at block 812 concurrently with execution of the testing process in the sandbox sub-environment. In one example, the operations 800 may proceed from block 812 to block 836 of FIG. 8C.

Referring to FIG. 8B, the operations 800 include, at block 814, selecting a network entity executing in the execution environment for installing the new certificate bundle. The new certificate bundle may be installed for purposes of performing a testing process that utilizes a testing service executing on the network entity. In one example, the network entity is a host network entity. The orchestration service may select the network entity for installing the new certificate bundle based on one or more policies maintained by a policy module.

At block 816, the operations 800 include initiating installation of the new certificate bundle on the network entity. The installation of the new certificate bundle on the network entity may be initiated in response to determining that the one or more testing operations are successful at block 806. Additionally, or alternatively, when the orchestration service determines that the one or more testing operations are unsuccessful, the orchestration service may refrain from initiating installation of the new certificate bundle on the network entity. The orchestration service may initiate installation of the new certificate bundle on the network entity by transmitting a command to a PKI service to distribute the new certificate bundle to the network entity. In response to the command from the orchestration service, the PKI service causes a certificate distribution service to distribute the new certificate bundle to the network entity. The network entity receives the certificate bundle and installs the certificate bundle in a storage medium associated with the network entity.

At block 818, the operations 800 include executing a testing process for utilizing a testing service executing on the network entity to perform a set of one or more testing operations pertaining to the new certificate bundle. The testing process may include one or more of the testing operations described with reference to FIG. 9B. In one example, the testing process at block 818 includes one or more testing service validations and/or one or more event service validations. Additionally, or alternatively, the testing process at block 818 may include one or more testing service authentications. The testing process may be initiated by the orchestration service. A testing service executing on the network entity may execute at least a portion of the testing process. The testing process may include transmitting a command from the orchestration service to the testing service to cause the testing service to execute the testing process. Additionally, or alternatively, the testing process may include the orchestration service receiving test results from the testing service and/or from the event monitoring service. Additionally, or alternatively, the orchestration service may detect events in an event log generated by the event monitoring service, and the events may be indicative of the test results.

At block 820, the operations 800 include determining whether the testing process executed utilizing the testing service is successful. When the orchestration service determines that the testing process executed utilizing the testing service is successful, the operations 800 may proceed to block 822. When the orchestration service determines that the testing process executed utilizing the testing service is unsuccessful, the system may abort the operations 800, or the system may suspend the operations 800, for example, until the system determines that the testing process is successful. In one example, one or more alerts may be generated in response to determining that the testing process is unsuccessful. One or more troubleshooting operations may be initiated in response to the one or more alerts.

At block 822, the operations 800 include determining whether the testing process is to be performed for an additional network entity that is executing a testing service in the execution environment. When the orchestration service determines that the testing process is to be performed for an additional network entity executing a testing service in the environment, the operations 800 may return to block 814, where an additional a network entity may be selected. When the orchestration service determines that the testing process is not to be performed for an additional network entity, the operations 800 may proceed to block 824. In one example, the operations 800 may proceed to block 824 upon having executed the testing process with respect to a set of one or more network entities that are executing a testing service in the execution environment. Additionally, or alternatively, the operations 800 may proceed to block 824 concurrently with executing the testing process for the additional network entities.

At block 824, the operations 800 include initiating activation of the new CA certificate in the execution environment. The new CA certificate may be activated in a portion of the execution environment associated with the network entity utilized to perform the testing process at block 818. The orchestration service initiates activation of the new CA certificate by causing transmission of entity certificates to network entities located in the portion of the execution environment corresponding to the testing process. The network entities may utilize the new entity certificates for authentication against the new CA certificate. In one example, the orchestration service transmits a command to a PKI service to issue new entity certificates to the network entities based on the new CA certificate. In response to the command from the orchestration service, the PKI service issues the new entity certificates and causes a certificate distribution service to distribute the new entity certificate to the network entities. In one example, the network entity utilized to perform the testing process is a host network entity, and the new CA certificate is activated with respect to the host network entity and a set of node network entities serviced by the host network entity. From block 824, the operations 800 may proceed to block 826 of FIG. 8C.

In one example, the orchestration service may determine, at block 820, that the testing process at block 818 is successful with respect to a first portion of the execution environment, and that the testing process is to be performed for another portion of the execution environment at block 822. Additionally, the operations 800 may include initiating activation of the new CA certificate with respect to the first portion of the execution environment at block 824 and executing the testing process at block 818 with respect to the second portion of the execution environment. The orchestration service may initiate activation of the new CA certificate with respect to the first portion of the execution environment. Additionally, the orchestration service may execute the testing process with respect to the second portion of the execution environment responsive to determining the testing process is successful with respect to the first portion of the execution environment and/or that the testing process is to be performed for the second portion of the execution environment.

The network entities in the first portion of the execution environment may utilize new entity certificates issued from the new CA to authenticate against the new CA certificate, while the testing process at block 818 is being performed with respect to the second portion of the execution environment. Additionally, or alternatively, when the orchestration service determines that the testing process at block 818 is not to be performed for an additional portion of the execution environment, the operations 800 may include initiating activation of the new CA certificate at block 824 with respect to the remainder of the execution environment.

In one example, the operations 800 include, at block 810 (FIG. 8A), maintaining the current certificate bundle that includes the current CA certificate in the execution environment concurrently with the testing process performed utilizing the network entity executing the testing service. In one example, the operations 800 include, at block 812 (FIG. 8A), authenticating, based at least in part on the current CA certificate of the current certificate bundle, an entity certificate of a network entity executing in the execution environment concurrently with the testing process performed utilizing the network entity executing the testing service.

Referring to FIG. 8C, the operations 800 include, at block 826, initiating installation of the new certificate bundle throughout the execution environment. The orchestration service may initiate installation of the new certificate bundle by transmitting a command to the PKI service to distribute the first certificate bundle to network entities throughout the execution environment. In response to the command from the orchestration service, the PKI service causes the certificate distribution service to distribute the new certificate bundle throughout the execution environment.

At block 828, the operations 800 include executing a testing process for utilizing a production service executing on a network entity in the execution environment to perform a set of one or more testing operations pertaining to the new certificate bundle. The testing process may include one or more of the testing operations described with reference to FIG. 9C. In one example, the testing process at block 828 includes one or more production service validations and/or one or more event service validations. Additionally, or alternatively, the testing process at block 828 may include one or more production service authentications. The testing process may be initiated by the orchestration service. A production service executing on the network entity may execute at least a portion of the testing process. The testing process may include transmitting a command from the orchestration service to the testing service to cause the testing service to execute the testing process. Additionally, or alternatively, the testing process may include the orchestration service receiving test results from the testing service and/or from the event monitoring service. Additionally, or alternatively, the orchestration service may detect events in an event log generated by the event monitoring service, and the events may be indicative of the test results.

At block 830, the operations 800 include determining whether the testing process executed utilizing the production service is successful. When the orchestration service determines that the testing process executed utilizing the production service is successful, the operations 800 may proceed to block 832. When the orchestration service determines that the first testing process executed utilizing the production service is unsuccessful, the system may abort the operations 800, or the system may suspend the operations 800, for example, until the system determines that the testing process is successful. In one example, one or more alerts may be generated in response to determining that the testing process is unsuccessful. One or more troubleshooting operations may be initiated in response to the one or more alerts.

At block 832, the operations 800 include determining whether the testing process is to be performed for an additional network entity utilizing a production service executing on the network entity. When the orchestration service determines that the testing process is to be performed for an additional network, the operations 800 may return to block 832, where an additional a network entity may be selected. When the orchestration service determines that the testing process is not to be performed for an additional network entity, the operations 800 may proceed to block 836. In one example, the operations 800 may proceed to block 836 upon having executed the testing process with respect to a set of one or more network entities that are executing a production service in the execution environment. Additionally, or alternatively, the operations 800 may proceed to block 824 concurrently with executing the testing process for the additional network entities.

At block 834, the operations 800 include initiating removal of the current CA certificate from the execution environment. As mentioned above, the current CA certificate is included in the new certificate bundle generated at block 802 (FIG. 8A) and installed in the execution environment at block 826. The orchestration service may initiate removal of the current CA certificate from the execution environment. The current CA certificate may be removed from a portion of the execution environment associated with the network entity utilized to perform the testing process at block 828. The current CA certificate may be removed from the execution environment by distributing an additional new certificate bundle that supersedes the new certificate bundle installed in the execution environment at block 826. The additional new certificate bundle includes the new CA certificate and is exclusive of (does not include) the current CA certificate. The orchestration service may cause the additional new certificate bundle to be distributed to the execution environment by transmitting a command to the PKI service to distribute the additional new certificate bundle to the execution environment. In response to the command from the orchestration service, the PKI service causes the certificate distribution service to distribute the additional new certificate bundle to the execution environment. At block 836, the operations 800 include authenticating entity certificates of network entities executing in the execution environment based at least in part on the new CA certificate.

In one example, the orchestration service may determine at block 830 that the testing process at block 828 is successful with respect to a first portion of the execution environment, and that the testing process is to be performed for another portion of the execution environment at block 822. Additionally, the operations 800 may include initiating removal of the current CA certificate with respect to the first portion of the execution environment at block 834 and executing the testing process at block 828 with respect to the second portion of the execution environment. The orchestration service may initiate removal of the current CA certificate with respect to the first portion of the execution environment. Additionally, the orchestration service may execute the testing process with respect to the second portion of the execution environment responsive to determining that the testing process is successful with respect to the first portion of the execution environment and/or that the testing process is to be performed for the second portion of the execution environment.

The network entities in the first portion of the execution environment may utilize new entity certificates issued from the new CA to authenticate against the new CA certificate, while the testing process at block 828 is being performed with respect to the second portion of the execution environment. Additionally, or alternatively, when the orchestration service determines that the testing process at block 828 is not to be performed for an additional portion of the execution environment, the operations 800 may include initiating removal of the current CA certificate at block 834 with respect to the remainder of the execution environment.

In one example, the operations 800 include, at block 810 (FIG. 8A), maintaining the current certificate bundle that includes the current CA certificate in the execution environment concurrently with the testing process performed utilizing the network entity executing the production service. In one example, the operations 800 include, at block 812 (FIG. 8A), authenticating, based at least in part on the current CA certificate of the current certificate bundle, an entity certificate of a network entity executing in the execution environment concurrently with the testing process performed utilizing the network entity executing the production service.

A. Example Testing Utilizing a Sandbox Sub-Environment

Figure 9A:
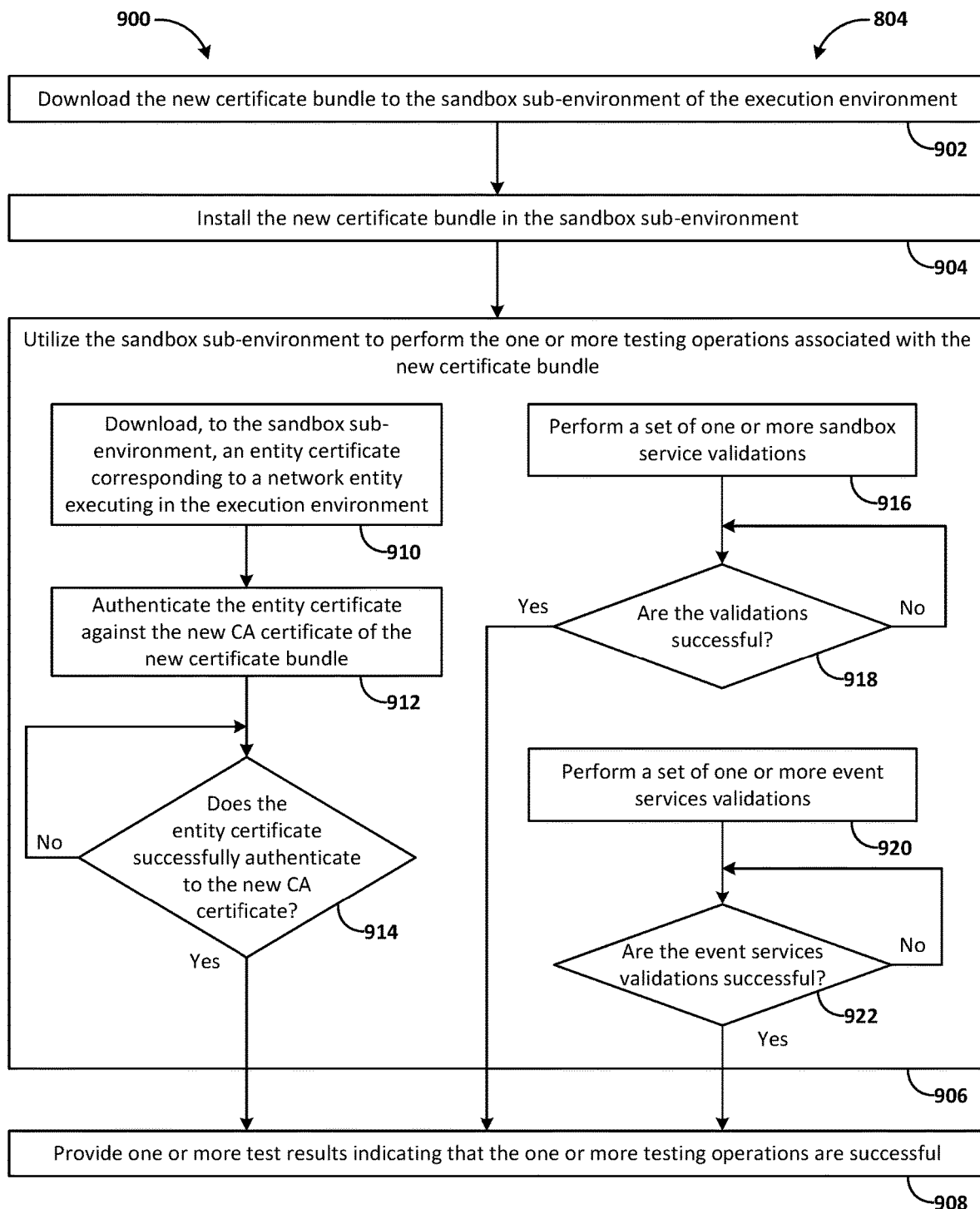
FIG. 9A is a flowchart that illustrates an example testing process for utilizing a sandbox sub-environment of an execution environment to perform testing operations pertaining to a certificate bundle in accordance with one or more embodiments.

Referring to FIG. 9A, example operations 900 associated with performing a testing process for testing a new certificate bundle in a sandbox sub-environment are further described.

One or more operations 900 described with reference to FIG. 9A may be modified, combined, rearranged, or omitted. Accordingly, the particular sequence of operations 900 described with reference to FIG. 9A should not be construed as limiting the scope of one or more embodiments. In one example, the operations 900 described with reference to FIG. 9A may include one or more operations 800 described with reference to FIGS. 8A-8C. Additionally, or alternatively, the operations 900 described with reference to FIG. 9A may include one or more operations 700 described with reference to FIGS. 7A-7C. In one example, the operations 900 may be performed by the one or more components of the system described with reference to FIGS. 6A-6C.

As shown in FIG. 9A, the operations 900 include, at block 902, downloading the new certificate bundle to the sandbox sub-environment of the execution environment. A sandbox instance executing in the sandbox sub-environment may download the new certificate bundle. At block 904, the operations 900 include installing the new certificate bundle in the sandbox sub-environment. The sandbox instance may install the new certificate bundle in a storage medium associated with the sandbox instance.

At block 906, the operations 900 include utilizing the sandbox sub-environment to perform the one or more testing operations associated with the new certificate bundle. The sandbox instance may execute at least a portion of the one or more testing operations. At block 908, the operations 900 include providing one or more test results indicating that the one or more testing operations are successful. The sandbox instance may provide the one or more test results to the orchestration service. Additionally, or alternatively, the event monitoring service may provide the one or more test results to the orchestration service.

The one or more testing operations at block 906 may include one or more sandbox service authentications. A sandbox service authentication may include one or more of the operations described with reference to block 910, block 912, and/or block 914. Additionally, or alternatively, the one or more testing operations at block 906 may include one or more sandbox service validations. A sandbox service validation may include one or more of the operations described with reference to block 916 and/or block 918. Additionally, or alternatively, the one or more testing operations at block 906 may include one or more event service validations associated with the one or more testing operations. An event service validation may include one or more of the operations described with reference to block 920 and/or block 922.

At block 910, the operations 900 include downloading, to the sandbox sub-environment, an entity certificate corresponding to a network entity executing in the execution environment. A certificate downloader executing on a sandbox instance in the sandbox sub-environment may download the new certificate bundle to a storage medium associated with the first network entity.

At block 912, the operations 900 include authenticating the entity certificate against the new CA certificate of the new certificate bundle. The sandbox instance may authenticate the entity certificate by validating a certificate chain that includes the entity certificate and the new CA certificate. At block 914, the operations 900 include determining whether the entity certificate successfully authenticates to the new CA certificate. When the system determines that the entity certificate successfully authenticates to the new CA certificate, the operations may proceed to block 908, where the sandbox instance provides a test result to the orchestration service, indicating a successful testing operation.

At block 916, the operations 900 include performing a set of one or more sandbox service validations. The one or more sandbox service validations may include validating that the sandbox instance has downloaded and installed the correct certificate bundle for testing. Additionally, or alternatively, the one or more sandbox service validations may include validating that the certificate bundle includes the correct set of CA certificates. The sandbox instance may perform the sandbox service validations by examining one or more file attributes of the certificate bundle and/or the CA certificates. Additionally, or alternatively, the sandbox instance may perform the sandbox service validations by comparing a first hash value corresponding to the certificate bundle and/or the CA certificates downloaded by the sandbox instance against a second hash value corresponding to the certificate bundle and/or the CA certificates in the certificate repository of the PKI service. Additionally, or alternatively, the sandbox instance may perform the sandbox service validations by comparing a first timestamp corresponding to the certificate bundle and/or the CA certificates downloaded by the sandbox instance against a second timestamp corresponding to the certificate bundle and/or the CA certificates in the certificate repository.

At block 918, the operations 900 include determining whether the set of one or more sandbox service validations are successful. When the system determines that the set of one or more sandbox service validations are successful, the operations may proceed to block 908, where the sandbox instance provides a test result to the orchestration service, indicating a successful testing operation.

At block 920, the operations 900 include performing a set of one or more event service validations. The one or more event service validations may include transmitting information from the event monitoring service to the orchestration service associated with operations performed by the sandbox service. The information from the event monitoring service may include file attributes, hash values, and/or timestamps associated with certificate bundles and/or entity certificates.

At block 922, the operations 900 include determining whether the set of one or more event service validations are successful. When the system determines that the set of one or more event service validations are successful, the operations may proceed to block 908, where the event monitoring service provides a test result to the orchestration service, indicating a successful testing operation.

B. Example Testing Utilizing a Testing Service in an Execution Environment

Figure 9B:
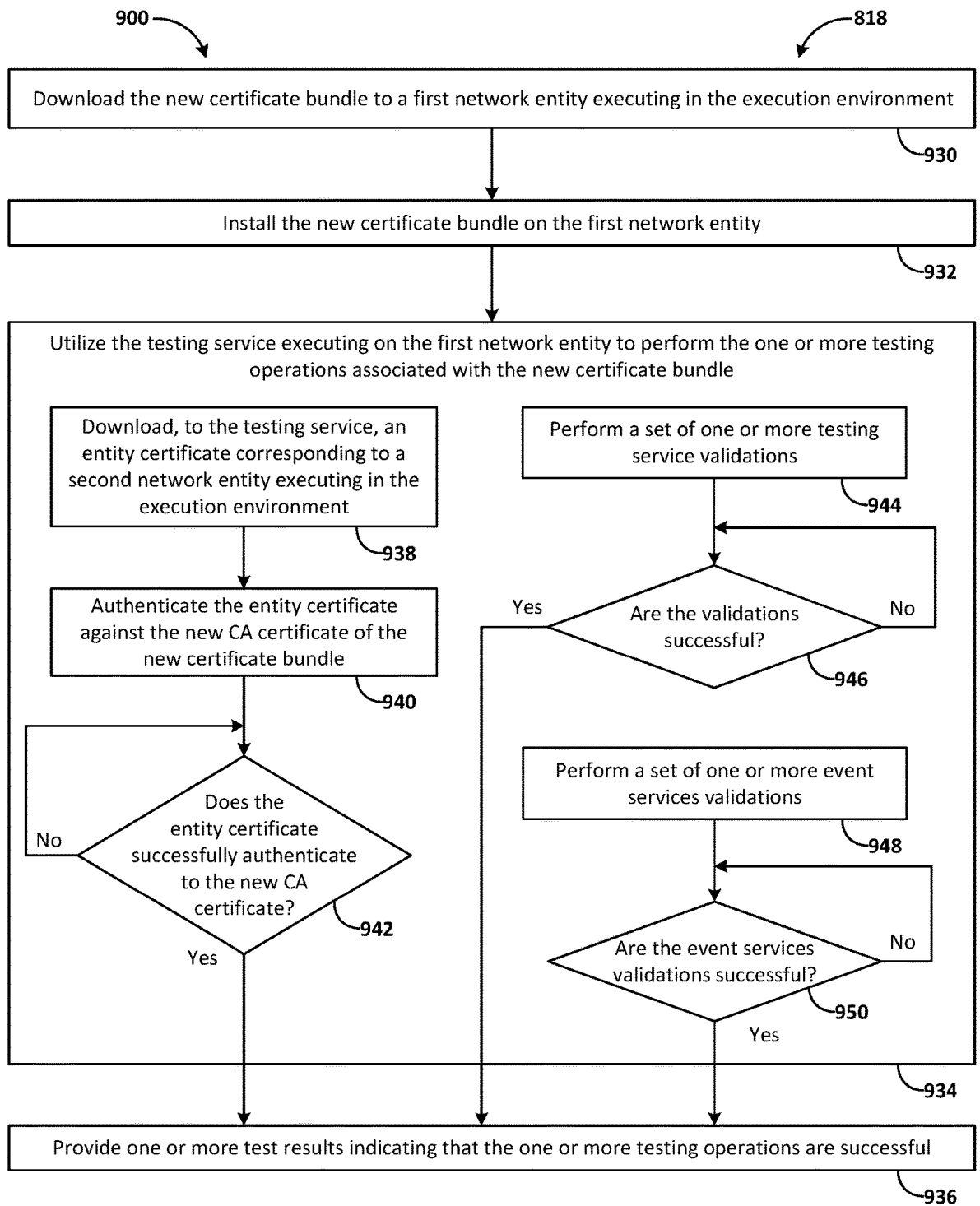
FIG. 9B is a flowchart that illustrates an example testing process for utilizing a testing service executing on a network entity in an execution environment to perform testing operations pertaining to a certificate bundle in accordance with one or more embodiments.

Referring to FIG. 9B, example operations 900 associated with performing a testing process for testing a certificate bundle utilizing a testing service installed on a network entity execution in an execution environment are further described. One or more operations 900 described with reference to FIG. 9B may be modified, combined, rearranged, or omitted. Accordingly, the particular sequence of operations 900 described with reference to FIG. 9B should not be construed as limiting the scope of one or more embodiments. In one example, the operations 900 described with reference to FIG. 9B may include one or more operations 800 described with reference to FIGS. 8A-8C. Additionally, or alternatively, the operations 900 described with reference to FIG. 9B may include one or more operations 700 described with reference to FIGS. 7A-7C. In one example, the operations 900 may be performed by the one or more components of the system described with reference to FIGS. 6A-6C.

As shown in FIG. 9B, the operations 900 include, at block 930, downloading the new certificate bundle to a first network entity executing in the execution environment. The first network entity may be a host network entity. A certificate downloader executing on the first network entity may download the new certificate bundle to a storage medium associated with the first network entity. At block 932, the operations 900 include installing the new certificate bundle on the first network entity. The certificate downloader may install the new certificate bundle in the storage medium associated with the first network entity.

At block 934, the operations 900 include utilizing a testing service executing on the first network entity to perform the one or more testing operations associated with the new certificate bundle. The testing service executing on the first network entity may execute at least a portion of the one or more testing operations. At block 936, the operations 900 include providing one or more test results indicating that the one or more testing operations are successful. The testing service executing on the first network entity may provide the one or more test results to the orchestration service. Additionally, or alternatively, the event monitoring service may provide the one or more test results to the orchestration service.

The one or more testing operations at block 934 may include one or more testing service authentications. A testing service authentication may include one or more of the operations described with reference to block 938, block 940, and/or block 942. Additionally, or alternatively, the one or more testing operations at block 934 may include one or more testing service validations. A testing service validation may include one or more of the operations described with reference to block 944 and/or block 946. Additionally, or alternatively, the one or more testing operations at block 934 may include one or more event service validations associated with the one or more testing operations at block 934. An event service validation may include one or more of the operations described with reference to block 948 and/or block 950.

At block 938, the operations 900 include downloading, to the testing service executing on the first network entity, an entity certificate corresponding to a second network entity executing in the execution environment. The second network entity may be a node network entity serviced by the first network entity. A certificate downloader executing on the first network entity may download the new certificate bundle to a storage medium associated with the first network entity.

At block 940, the operations 900 include authenticating the entity certificate against the new CA certificate of the new certificate bundle. The testing service may authenticate the entity certificate by validating a certificate chain that includes the entity certificate and the new CA certificate. In one example, the entity certificate downloaded at block 938 and authenticated at block 940 may be a sample entity certificate received from a certificate distribution service. Additionally, or alternatively, the entity certificate downloaded at block 938 and authenticated at block 940 may be a received from another network entity executing in the execution environment. In one example, a new entity certificate generated by the PKI service may be transmitted to a first network entity, such as a host network entity, and the host network entity may transmit the new entity certificate to a second network entity such as a node network entity. The host network entity may receive and/or download the entity certificate from the node network entity at block 938 for authentication at block 940. Additionally, or alternatively, the new entity certificate downloaded at block 938 and authenticated at block 840 may be utilized in for authentication in accordance with a security protocol in the execution environment. In one example, the new entity certificate generated by the PKI service may be transmitted to a first network entity, such as a host network entity, and the host network entity may utilize the new entity certificate for authentication in accordance with a security protocol in the execution environment. In one example, the first network entity that downloads the new entity certificate at block 938 may transmit the new entity certificate to a third network entity executing in the execution, and the third network entity may authenticate the new entity certificate against the new CA certificate.

At block 942, the operations 900 include determining whether the entity certificate successfully authenticates to the new CA certificate. When the testing service determines that the entity certificate successfully authenticates to the new CA certificate, the operations may proceed to block 936, where the testing service executing on the first network entity provides a test result to the orchestration service indicating a successful testing operation.

At block 944, the operations 900 include performing a set of one or more testing service validations. The one or more testing service validations may include validating that the network entity that is executing the testing service has downloaded and installed the correct certificate bundle for testing. Additionally, or alternatively, the one or more testing service validations may include validating that the certificate bundle includes the correct set of CA certificates. The testing service may perform the testing service validations by examining one or more file attributes of the certificate bundle and/or the CA certificates. Additionally, or alternatively, the testing service may perform the testing service validations by comparing a first hash value corresponding to the certificate bundle and/or the CA certificates downloaded by the network entity that is executing the testing service against a second hash value corresponding to the certificate bundle and/or the CA certificates in the certificate repository of the PKI service. Additionally, or alternatively, the testing service may perform the testing service validations by comparing a first timestamp corresponding to the certificate bundle and/or the CA certificates downloaded by the network entity that is executing the testing service against a second timestamp corresponding to the certificate bundle and/or the CA certificates in the certificate repository.

At block 946, the operations 900 include determining whether the set of one or more testing service validations are successful. When the testing service determines that the set of one or more testing service validations are successful, the operations may proceed to block 936, where the testing service provides a test result to the orchestration service indicating a successful testing operation.

At block 948, the operations 900 include performing a set of one or more event service validations. The one or more event service validations may include transmitting information from the event monitoring service to the orchestration service associated with operations performed by the testing service. The information from the event monitoring service may include file attributes, hash values, and/or timestamps associated with certificate bundles and/or entity certificates.

At block 950, the operations 900 include determining whether the set of one or more event service validations are successful. When the event monitoring service determines that the set of one or more event service validations are successful, the operations may proceed to block 936, where the event monitoring service provides a test result to the orchestration service indicating a successful testing operation.

C. Example Testing Utilizing a Production Service in the Execution Environment

Figure 9C:
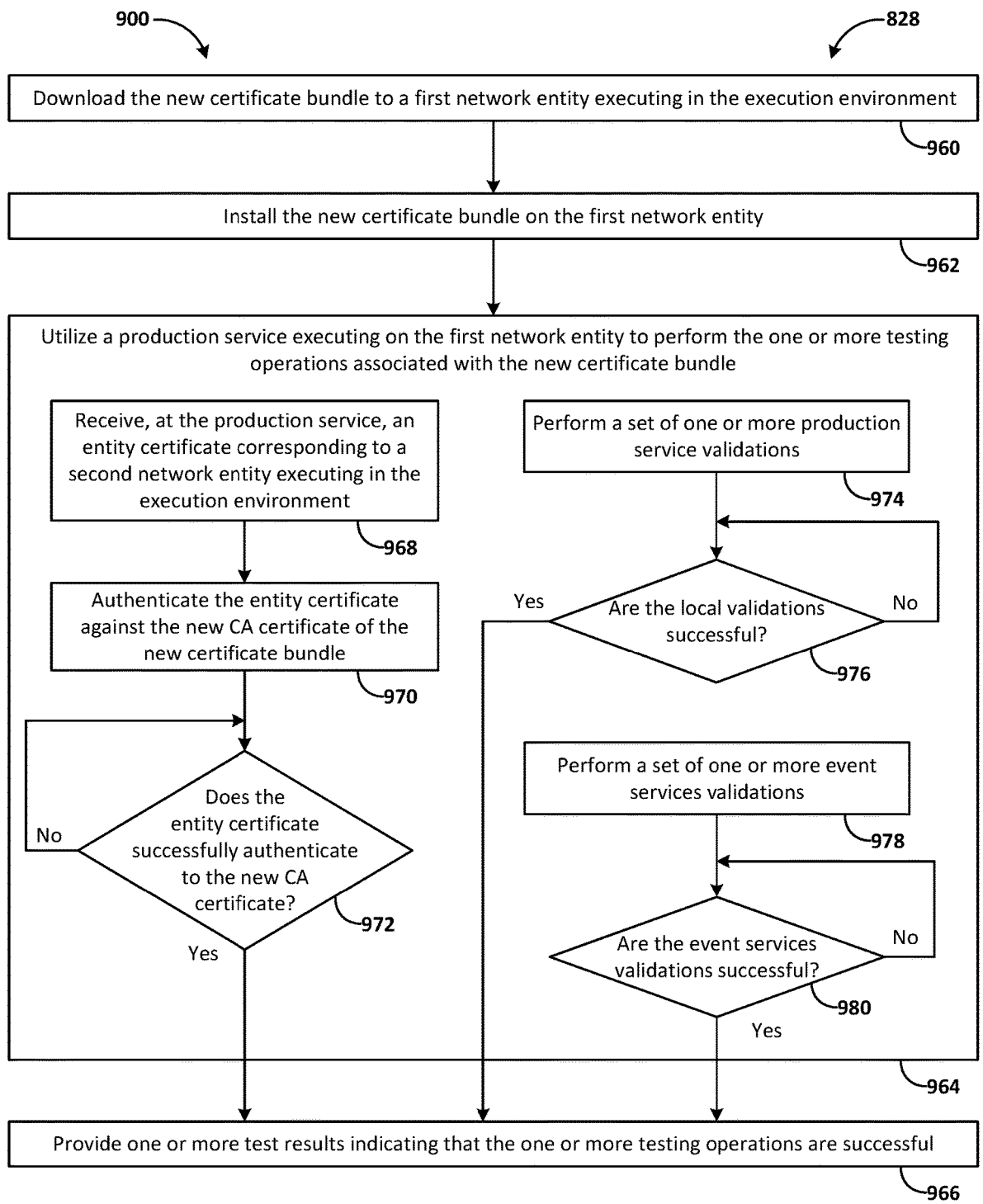
FIG. 9C is a flowchart that illustrates an example testing process for utilizing a production service executing on a network entity in an execution environment to perform testing operations pertaining to a certificate bundle in accordance with one or more embodiments.

Referring to FIG. 9C, example operations 900 associated with performing a testing process for testing a certificate bundle utilizing a production service installed on a network entity executing in an execution environment are further described. One or more operations 900 described with reference FIG. 9C may be modified, combined, rearranged, or omitted. Accordingly, the particular sequence of operations 900 described with reference to FIG. 9C should not be construed as limiting the scope of one or more embodiments. In one example, the operations 900 described with reference to FIG. 9C may include one or more operations 800 described with reference to FIGS. 8A-8C. Additionally, or alternatively, the operations 900 described with reference to FIG. 9C may include one or more operations 700 described with reference to FIGS. 7A-7C. In one example, the operations 900 may be performed by the one or more components of the system described with reference to FIGS. 6A-6C.

As shown in FIG. 9C, the operations 900 include, at block 960, downloading the new certificate bundle to the first network entity executing in the execution environment. The first network entity may be a host network entity. The first network entity described with reference to FIG. 9C may be the first network entity described with reference to FIG. 9B, or the first network entity described with reference to FIG. 9C may be a different network entity from the first network entity described with reference to FIG. 9B.

A certificate downloader executing on the first network entity may download the new certificate bundle to a storage medium associated with the first network entity. At block 962, the operations 900 include installing the new certificate bundle on the first network entity. The certificate downloader may install the new certificate bundle in the storage medium associated with the first network entity.

At block 964, the operations 900 include utilizing a production service executing on the first network entity to perform the one or more testing operations associated with the new certificate bundle. The production service executing on the first network entity may execute at least a portion of the one or more testing operations. At block 966, the operations 900 include providing one or more test results indicating that the one or more testing operations are successful. The production service executing on the first network entity may provide the one or more test results to the orchestration service. Additionally, or alternatively, the event monitoring service may provide the one or more test results to the orchestration service.

The one or more testing operations at block 964 may include one or more production service authentications. A production service authentication may include one or more of the operations described with reference to block 968, block 970, and/or block 972. Additionally, or alternatively, the one or more testing operations at block 964 may include one or more production service validations. A production service validation may include one or more of the operations described with reference to block 974 and/or block 976. Additionally, or alternatively, the one or more testing operations at block 964 may include one or more event service validations associated with the one or more testing operations at block 964. An event service validation may include one or more of the operations described with reference to block 978 and/or block 980.

At block 968, the operations 900 include receiving, at the production service executing on the first network entity, an entity certificate corresponding to a second network entity executing in the execution environment. The second network entity may be a node network entity serviced by the first network entity. The second network entity described with reference to FIG. 9C may be the second network entity described with reference to FIG. 9B, or the second network entity described with reference to FIG. 9C may be a different network entity from the second network entity described with reference to FIG. 9B. The production service may receive the entity certificate from the second network entity for authentication in accordance with a security protocol associated with executing a production operation. The production operation may include a communication exchange between the first network entity and the second network entity that occurs after having authenticated in accordance with the security protocol.

At block 970, the operations 900 include authenticating the entity certificate received from the second network entity against the new CA certificate of the new certificate bundle. The production service may authenticate the entity certificate by validating a certificate chain that includes the entity certificate and the new CA certificate. At block 972, the operations 900 include determining whether the entity certificate successfully authenticates to the new CA certificate. When the production service determines that the entity certificate successfully authenticates to the new CA certificate, the operations may proceed to block 966, where the production service executing on the first network entity provides a test result to the orchestration service indicating a successful testing operation.

At block 974, the operations 900 include performing a set of one or more production service validations. The one or more production service validations may include validating the network entity that is executing the production service has downloaded and installed the correct certificate bundle for testing. Additionally, or alternatively, the one or more production service validations may include validating the certificate bundle includes the correct set of CA certificates. The production service may perform the production service validations by examining one or more file attributes of the certificate bundle and/or the CA certificates. Additionally, or alternatively, the production service may perform the production service validations by comparing a first hash value corresponding to the certificate bundle and/or the CA certificates downloaded by the network entity that is executing the production service against a second hash value corresponding to the certificate bundle and/or the CA certificates in the certificate repository of the PKI service. Additionally, or alternatively, the production service may perform the production service validations by comparing a first timestamp corresponding to the certificate bundle and/or the CA certificates downloaded by the network entity that is executing the production service against a second timestamp corresponding to the certificate bundle and/or the CA certificates in the certificate repository.

At block 976, the operations 900 include determining whether the set of one or more production service validations are successful. When the production service determines that the set of one or more production service validations are successful, the operations may proceed to block 966, where the production service provides a test result to the orchestration service, indicating a successful testing operation.

At block 978, the operations 900 include performing a set of one or more event service validations. The one or more event service validations may include transmitting information from the event monitoring service to the orchestration service associated with operations performed by the production service. The information from the event monitoring service may include file attributes, hash values, and/or timestamps associated with certificate bundles and/or entity certificates.

At block 980, the operations 900 include determining whether the set of one or more event service validations are successful. When the event monitoring service determines that the set of one or more event service validations are successful, the operations may proceed to block 936, where the event monitoring service provides a test result to the orchestration service, indicating a successful testing operation.

8. Miscellaneous; Extensions

Embodiments are directed to a system with one or more devices that include a hardware processor and that are configured to perform any of the operations described herein and/or recited in any of the claims below. Embodiments are directed to a system that includes means to perform any of the operations described herein and/or recited in any of the claims below. In an embodiment, a non-transitory, computer-readable storage medium comprises instructions that, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of patent protection, and what is intended by the applicants to be the scope of patent protection, is the literal and equivalent scope of the set of claims that issue from this application in the specific form that such claims issue, including any subsequent correction.

References, including publications, patent applications, and patents, cited herein are hereby incorporated by reference to the same extent as if the references were individually and specifically indicated to be incorporated by reference and were set forth in entirety herein.

What is claimed is:

1. One or more non-transitory computer-readable media storing instructions that, when executed by one or more hardware processors, cause performance of operations comprising:
 installing a first certificate bundle on a first network entity executing in an execution environment of a virtual cloud network,
  wherein the first certificate bundle comprises a first certificate authority (CA) certificate and a second CA certificate;
 executing a set of one or more testing processes associated with the first certificate bundle, at least by executing a first testing process comprising:

utilizing a first testing service executing on the first network entity to perform a first set of one or more testing operations, the first set of one or more testing operations comprising:
receiving, at the first network entity, a first entity certificate issued based on the first CA certificate,
utilizing the first testing service to authenticate the first entity certificate against the first CA certificate;
wherein while executing the set of one or more testing processes, the second CA certificate is active in the execution environment for authenticating a second entity certificate issued to a second network entity based on the second CA certificate;
determining, based at least on successfully authenticating the first entity certificate against the first CA certificate, that the set of one or more testing processes are successful;
wherein responsive to determining that the set of one or more testing processes are successful, the first CA certificate is activated in the execution environment at least by transmitting to the second network entity, a third entity certificate issued to the second network entity for authentication against the first CA certificate, wherein the third entity certificate supersedes the second entity certificate.

2. The one or more non-transitory computer-readable media of claim 1, wherein the first entity certificate is a sample entity certificate corresponding to the second network entity.

3. The one or more non-transitory computer-readable media of claim 1, wherein the first set of one or more testing operations further comprises:
receiving a fourth entity certificate from a certificate distribution service, wherein the fourth entity certificate is issued to a third network entity based on the first CA certificate;
transmitting the fourth entity certificate to the third network entity;
utilizing the first testing service to execute a first authentication protocol comprising:
receiving the fourth entity certificate from the third network entity, and
authenticating the fourth entity certificate against the first CA certificate;
determining that the set of one or more testing processes are successful based at least on determining that the fourth entity certificate successfully authenticates to the first CA certificate.

4. The one or more non-transitory computer-readable media of claim 3,
wherein the fourth entity certificate supersedes a fifth entity certificate issued to the third network entity based on the second CA certificate,
wherein the third network entity transmits the fourth entity certificate to a fourth network entity,
wherein the fourth network entity authenticates the third network entity at least by executing a second authentication protocol comprising authenticating the fourth entity certificate against the first CA certificate.

5. The one or more non-transitory computer-readable media of claim 3, wherein the first set of one or more testing operations further comprises:
subsequent to authenticating the fourth entity certificate against the first CA certificate:
receiving, from the certificate distribution service a fifth entity certificate issued to the third network entity based on the second CA certificate, wherein the fifth entity certificate supersedes the fourth entity certificate;
transmitting the fifth entity certificate to the third network entity, wherein the third network entity utilizes the fifth entity certificate in a second authentication protocol comprising authenticating the fifth entity certificate against the second CA certificate.

6. The one or more non-transitory computer-readable media of claim 5, wherein activation of the first CA certificate in the execution environment further comprises:
receiving, from the certificate distribution service a sixth entity certificate issued to the third network entity based on the first CA certificate, wherein the sixth entity certificate supersedes the fifth entity certificate;
transmitting the sixth entity certificate to the third network entity, wherein the third network entity utilizes the sixth entity certificate in a third authentication protocol comprising authenticating the sixth entity certificate against the first CA certificate.

7. The one or more non-transitory computer-readable media of claim 1, wherein executing the set of one or more testing processes associated with the first certificate bundle further comprises:
executing a second testing process comprising:
utilizing a second testing service executing on a third network entity located in a first portion of the execution environment to perform a second set of one or more testing operations;
responsive to determining that the second set of one or more testing operations is successful:
initiating activation of the first CA certificate in the first portion of the execution environment, and
executing a third testing process comprising:
utilizing a third testing service executing on a fourth network entity located in a second portion of the execution environment to perform a third set of one or more testing operations;
initiating activation of the first CA certificate in the second portion of the execution environment responsive to determining that the third set of one or more testing operations is successful.

8. The one or more non-transitory computer-readable media of claim 7, wherein the second set of one or more testing operations comprises:
transmitting a fourth entity certificate issued to the third network entity based on the first CA certificate in response to a first epoch date update associated with the first portion of the execution environment,
wherein the third network entity is located in the first portion of the execution environment, wherein the third network entity utilizes the fourth entity certificate in a first authentication protocol comprising authenticating the fourth entity certificate against the first CA certificate;
determining that the second set of one or more testing operations is successful based at least on determining that the fourth entity certificate successfully authenticates to the first CA certificate,
wherein the third set of one or more testing operations comprises:
transmitting a fifth entity certificate issued to the fourth network entity based on the first CA certificate in response to a second epoch date update associated with the second portion of the execution environment,
wherein the fourth network entity is located in the second portion of the execution environment, wherein the fourth network entity utilizes the fifth entity certificate in a second authentication protocol comprising authenticating the fifth entity certificate against the first CA certificate;
determining that the third set of one or more testing operations is successful based at least on determining that the fifth entity certificate successfully authenticates to the first CA certificate.

9. The one or more non-transitory computer-readable media of claim 7, wherein activation of the first CA certificate in the execution environment comprises:
activating the first CA certificate throughout a remainder of the execution environment exclusive of the first portion of the execution environment and the second portion of the execution environment responsive to determining that the set of one or more testing processes are successful.

10. The one or more non-transitory computer-readable media of claim 1, wherein the first testing process further comprises:
comparing a first hash value representing the first entity certificate as received at the first network entity to a second hash value representing the first entity certificate as generated by a public key infrastructure service;
determining that the first hash value matches the second hash value;
determining that the set of one or more testing processes are successful based at least on determining that the first hash value matches the second hash value.

11. The one or more non-transitory computer-readable media of claim 1, wherein the operations further comprise:
subsequent to the first CA certificate being activated in the execution environment: installing on the first network entity, a second certificate bundle comprising the first CA certificate, wherein the second certificate bundle is exclusive of the second CA certificate, wherein the second certificate bundle supersedes the first certificate bundle.

12. The one or more non-transitory computer-readable media of claim 1, wherein executing the set of one or more testing processes associated with the first certificate bundle further comprises:
executing a second testing process comprising:
utilizing a first production service executing on a third network entity located in a first portion of the execution environment to perform a second set of one or more testing operations;
responsive to determining that the second set of one or more testing operations is successful:
initiating activation of the first CA certificate in the first portion of the execution environment, and
executing a third testing process comprising:
utilizing a second production service executing on a fourth network entity located in a second portion of the execution environment to perform a third set of one or more testing operations;
initiating activation of the first CA certificate in the second portion of the execution environment responsive to determining that the third set of one or more testing operations is successful.

13. A method, comprising:
installing a first certificate bundle on a first network entity executing in an execution environment of a virtual cloud network,
wherein the first certificate bundle comprises a first certificate authority (CA) certificate and a second CA certificate;

executing a set of one or more testing processes associated with the first certificate bundle, at least by executing a first testing process comprising:
utilizing a first testing service executing on the first network entity to perform a first set of one or more testing operations, the first set of one or more testing operations comprising:
receiving, at the first network entity, a first entity certificate issued based on the first CA certificate,
utilizing the first testing service to authenticate the first entity certificate against the first CA certificate;
wherein while executing the set of one or more testing processes, the second CA certificate is active in the execution environment for authenticating a second entity certificate issued to a second network entity based on the second CA certificate;
determining, based at least on successfully authenticating the first entity certificate against the first CA certificate, that the set of one or more testing processes are successful;
wherein responsive to determining that the set of one or more testing processes are successful, the first CA certificate is activated in the execution environment at least by transmitting to the second network entity, a third entity certificate issued to the second network entity for authentication against the first CA certificate, wherein the third entity certificate supersedes the second entity certificate;
wherein the method is performed by at least one device including a hardware processor.

14. The method of claim 13, wherein the first set of one or more testing operations further comprises:
receiving a fourth entity certificate from a certificate distribution service, wherein the fourth entity certificate is issued to a third network entity based on the first CA certificate;
transmitting the fourth entity certificate to the third network entity;
utilizing the first testing service to execute a first authentication protocol comprising:
receiving the fourth entity certificate from the third network entity, and
authenticating the fourth entity certificate against the first CA certificate;
determining that the set of one or more testing processes are successful based at least on determining that the fourth entity certificate successfully authenticates to the first CA certificate.

15. The method of claim 14, wherein the first set of one or more testing operations further comprises:
subsequent to authenticating the fourth entity certificate against the first CA certificate:
receiving, from the certificate distribution service a fifth entity certificate issued to the third network entity based on the second CA certificate, wherein the fifth entity certificate supersedes the fourth entity certificate;
transmitting the fifth entity certificate to the third network entity, wherein the third network entity utilizes the fifth entity certificate in a second authentication protocol comprising authenticating the fifth entity certificate against the second CA certificate.

16. The method of claim 15, wherein activation of the first CA certificate in the execution environment further comprises:

receiving, from the certificate distribution service a sixth entity certificate issued to the third network entity based on the first CA certificate, wherein the sixth entity certificate supersedes the fifth entity certificate;

transmitting the sixth entity certificate to the third network entity, wherein the third network entity utilizes the sixth entity certificate in a third authentication protocol comprising authenticating the sixth entity certificate against the first CA certificate.

17. The method of claim 13, wherein executing the set of one or more testing processes associated with the first certificate bundle further comprises:

executing a second testing process comprising:
utilizing a second testing service executing on a third network entity located in a first portion of the execution environment to perform a second set of one or more testing operations;
responsive to determining that the second set of one or more testing operations is successful:
initiating activation of the first CA certificate in the first portion of the execution environment, and
executing a third testing process comprising:
utilizing a third testing service executing on a fourth network entity located in a second portion of the execution environment to perform a third set of one or more testing operations;
initiating activation of the first CA certificate in the second portion of the execution environment responsive to determining that the third set of one or more testing operations is successful.

18. The method of claim 17, wherein activation of the first CA certificate in the execution environment comprises:

activating the first CA certificate throughout a remainder of the execution environment exclusive of the first portion of the execution environment and the second portion of the execution environment responsive to determining that the set of one or more testing processes are successful.

19. The method of claim 13, wherein executing the set of one or more testing processes associated with the first certificate bundle further comprises:

executing a second testing process comprising:
utilizing a first production service executing on a third network entity located in a first portion of the execution environment to perform a second set of one or more testing operations;
responsive to determining that the second set of one or more testing operations is successful:
initiating activation of the first CA certificate in the first portion of the execution environment, and
executing a third testing process comprising:
utilizing a second production service executing on a fourth network entity located in a second portion of the execution environment to perform a third set of one or more testing operations;
initiating activation of the first CA certificate in the second portion of the execution environment responsive to determining that the third set of one or more testing operations is successful.

20. A system, comprising:
at least one hardware processor;
wherein the system is configured to execute operations, using the at least one hardware processor, the operations comprising:
installing a first certificate bundle on a first network entity executing in an execution environment of a virtual cloud network,
wherein the first certificate bundle comprises a first certificate authority (CA) certificate and a second CA certificate;
executing a set of one or more testing processes associated with the first certificate bundle, at least by executing a first testing process comprising:
utilizing a first testing service executing on the first network entity to perform a first set of one or more testing operations, the first set of one or more testing operations comprising:
receiving, at the first network entity, a first entity certificate issued based on the first CA certificate,
utilizing the first testing service to authenticate the first entity certificate against the first CA certificate;
wherein while executing the set of one or more testing processes, the second CA certificate is active in the execution environment for authenticating a second entity certificate issued to a second network entity based on the second CA certificate;
determining, based at least on successfully authenticating the first entity certificate against the first CA certificate, that the set of one or more testing processes are successful;
wherein responsive to determining that the set of one or more testing processes are successful, the first CA certificate is activated in the execution environment at least by transmitting to the second network entity, a third entity certificate issued to the second network entity for authentication against the first CA certificate, wherein the third entity certificate supersedes the second entity certificate.

* * * * *